United States Patent
Hammond et al.

(10) Patent No.: US 12,345,963 B1
(45) Date of Patent: Jul. 1, 2025

(54) ORTHOKERATOLOGY CONTACT LENSES AND RELATED METHODS

(71) Applicant: CooperVision International Limited, Fareham (GB)

(72) Inventors: David S. Hammond, Pleasanton, CA (US); Arthur Bradley, Bloomington, IN (US); Baskar Arumugam, Dublin, CA (US); Myhanh Nguyen, Pleasanton, CA (US); Paul Chamberlain, Livermore, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 19/108,748

(22) PCT Filed: Oct. 16, 2023

(86) PCT No.: PCT/GB2023/052678
§ 371 (c)(1),
(2) Date: Mar. 5, 2025

(87) PCT Pub. No.: WO2024/084190
PCT Pub. Date: Apr. 25, 2024

Related U.S. Application Data

(60) Provisional application No. 63/417,346, filed on Oct. 19, 2022.

(51) Int. Cl.
*G02C 7/04* (2006.01)

(52) U.S. Cl.
CPC .................. *G02C 7/047* (2013.01)

(58) Field of Classification Search
CPC .......... G02C 7/047; G02C 7/04; G02C 7/044; G02C 2202/04; G02C 2202/24; G02B 1/043; A61F 9/013; A61F 9/0017
See application file for complete search history.

(56) References Cited

U.S. PATENT DOCUMENTS 5,963,297 A * 10/1999 Reim ..................... G02C 7/047
351/159.23
6,010,219 A * 1/2000 Stoyan ................... G02C 7/047
351/159.23
(Continued)

FOREIGN PATENT DOCUMENTS

CN 209417454 U 9/2019
CN 114167623 A 3/2022
(Continued)

OTHER PUBLICATIONS

International Search Report and Written Opinion issued in corresponding International Patent Application No. PCT/GB2023/052678 mailed Feb. 13, 2024 (33 pages).
(Continued)

*Primary Examiner* — Mustak Choudhury
(74) *Attorney, Agent, or Firm* — Kilyk & Bowersox, P.L.L.C.

(57) ABSTRACT

The present disclosure provides orthokeratology lenses (201) and methods of manufacturing such lenses (201). The orthokeratology lenses (201) disclosed herein comprise a correction region (206) for reducing the curvature of a central portion of a cornea, an annular treatment recess (208) for inducing myopic defocus in a peripheral portion of the cornea and a regulating region (210) for regulating the myopic defocus induced by the annular treatment recess (208).

15 Claims, 8 Drawing Sheets

(56) References Cited

U.S. PATENT DOCUMENTS

| | | | | |
|---|---|---|---|---|
| 6,543,897 B1* | 4/2003 | Tung | ................... | G02C 7/047 |
| | | | | 351/159.23 |
| 6,652,095 B2* | 11/2003 | Tung | ................... | G02C 7/041 |
| | | | | 351/159.23 |
| 2009/0303442 A1* | 12/2009 | Choo | ................... | G02C 7/047 |
| | | | | 351/159.22 |
| 2017/0010479 A1* | 1/2017 | Meyers | ............... | G02C 7/027 |
| 2018/0329227 A1* | 11/2018 | Chow | ................ | G02C 7/047 |
| 2020/0133024 A1* | 4/2020 | Paune Fabre | ....... | G02C 7/047 |

FOREIGN PATENT DOCUMENTS

| | | |
|---|---|---|
| TW | 200612126 A | 4/2006 |
| WO | 2014184399 A1 | 11/2014 |

OTHER PUBLICATIONS

PCT Demand filed Jul. 3, 2024 in corresponding International Patent Application No. PCT/GB2023/052678 (23 pages).

Second Written Opinion issued in corresponding International Patent Application No. PCT/GB2023/052678 dated Jul. 23, 2024 (8 pages).

Response to Second Written Opinion filed Sep. 23, 2024 in corresponding International Patent Application No. PCT/GB2023/052678 (16 pages).

International Preliminary Report on Patentability issued in corresponding International Patent Application No. PCT/GB2023/052678 dated Jan. 31, 2025 (22 pages).

Office Action issued in corresponding Taiwan Patent Application No. 112139297 dated May 29, 2024 (24 pages).

* cited by examiner

ORTHOKERATOLOGY CONTACT LENSES AND RELATED METHODS

This application is a National Stage Application of PCT/GB2023/052678, filed Oct. 16, 2023, which claims priority to U.S. Patent Application No. 63/417,346, filed Oct. 19, 2022.

FIELD OF THE PRESENT DISCLOSURE

The present disclosure relates to orthokeratology contact lenses and methods. The present disclosure relates especially, but not exclusively, to contact lenses for reshaping a cornea of an eye to provide an optical correction for myopia and to slow its progression. The present disclosure also relates to methods of manufacturing such lenses.

BACKGROUND

Myopia (also referred to as near-sightedness or short-sightedness) is an eye condition that occurs primarily due to an elongated eye. Uncorrected myopic eyes focus incoming light from distant objects to a location in front of the retina. Once light enters the eye, it converges towards a focal surface in front of the retina beyond which it then diverges, and is out of focus upon arrival at the retina. The result is that a person with myopia cannot focus on far-away objects.

Many people use contact lenses to correct for myopia. Conventional contact lenses for correcting myopia reduce the convergence of light passing through the contact lens shifting the image plane onto the retina. Distance vision is only improved when the eye+lens power is reduced either with contact lenses, spectacle lenses or reshaping of the cornea. Also, although conventional contact lenses correct for the mismatch between the optical power and eye length, they do not treat the underlying eye size anomaly that underlies the myopia.

It was suggested several decades ago that progression of myopia in children or young people could be slowed by under-correcting, i.e., moving the focus towards but not quite onto the retina. However, that approach necessarily results in degraded distance vision compared with the vision obtained with a lens that fully corrects for myopia. Moreover, it is now regarded as doubtful that under-correction is effective in controlling developing myopia. A more recent approach that can simultaneously provide a focused image at the retina and slow the progressive eye growth is to use lenses having one or more regions that provide full correction of distance vision and one or more regions that under-correct, or deliberately induce, myopic defocus. It has been shown that this approach can slow down the development or progression of myopia in children or young people, whilst providing good distance vision.

In the case of lenses having regions that provide myopic defocus, the regions that provide full-correction of distance vision are usually referred to as base power regions and the regions that provide under-correction are usually referred to as myopic defocus regions or add power regions (because the dioptric power is more positive, or less negative, than the power of the distance regions). A surface (typically the anterior surface) of the add power region(s) has a smaller radius of curvature than that of the distance power region(s) and therefore provides a more positive or less negative power to the eye. The add power regions are designed to focus light anterior to (in front of) the retina when the distance correction optics are focusing light at or near to the retina.

A known type of contact lens that reduces the progression of myopia is a dual-focus contact lens available under the name of MISIGHT (CooperVision, Inc.), as shown in FIG. 1. The lens 100 has a central correction zone 101 and two further annular correction zones 102 and 104. The corrections zones 101, 102 and 104 are distance power regions that provide a stable correction power or base power across each zone. The lens also has two annular treatment zones 106 and 108. Each treatment zone 106 and 108 is located between two corrections zones 101, 102 and 104. The treatment zones 106 and 108 provide an add power or myopic defocus. The diameter of the correction zones 101, 102 and 104 and treatment zones 106 and 108 are well defined and the power provided is stable across each region. This dual-focus lens is different than bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones 106 and 108 of the dual-focus lens that have the add power are designed to provide a myopically defocused image at both distant and near viewing distances.

Although it has been shown that MISIGHT type lenses correct myopia and slow the progression of myopia in children (Chamberlain et al. 2019, *Optometry and Vision Science*, 96 (8): 556-567; Chamberlain et al. 2022, *Optometry and Vision Science*, 99 (3): 204-212), myopia correction and treatment is only achieved when the lenses are worn. An alternative to dual-focus contact lenses for providing an optical correction for already present myopia while also slowing future progression is orthokeratology treatment. Studies have shown that overnight wear of orthokeratology lenses produces optical correction of myopia (Mountford et al. 2004, *Orthokeratology: principles and practice*, Butterworth-Heinemann Medical) and may also be effective in slowing myopia progression (Cho et al. 2005, *Current Eye Research* 30 (1): 71-80). Orthokeratology lenses (commonly referred to as 'ortho-K' lenses) correct myopia by re-shaping the cornea surface to modify the curvature of the cornea in defined regions. Thus, orthokeratology lenses impart physical changes to the myopic eyes to improve vision.

Orthokeratology lenses comprise a central region defined by a posterior surface with a low curvature or flat profile designed to flatten the curvature of the cornea. When the lens is worn, the central correction region exerts a pressure or compressive forces on the corneal epithelium layer which redistributes corneal tissue and/or fluid from a central portion of the cornea to a peripheral portion of the cornea. This redistribution reduces the curvature of the cornea by compressing the cornea at its apex. As the curvature of the cornea in a myope is too steep to focus light on the retina, a reduction in the cornea curvature shifts the focus of light onto the retina and therefore corrects myopia, providing improved distance vision. Examples of orthokeratology lenses are disclosed in U.S. Pat. Nos. 6,543,897, 6,652,095. Although it is disclosed therein that orthokeratology lenses may correct myopia, hyperopia and/or presbyopia that has already developed, it is not disclosed that such lenses are suitable for treating or slowing myopia progression.

Orthokeratology lenses gradually reshape the cornea and so are typically worn overnight. After several hours of wear, the cornea will have been reshaped to correct for the myopia and the user can remove them, for example in the morning. After the lens is removed, the cornea retains its new shape for several hours allowing the user to focus on long-distance objects without the need for corrective lenses. Thus, orthokeratology lenses provide an advantage over other contact lenses in that vision remains corrected even when the lens is not being worn. During the course of the day when the lens has been removed, the cornea will partially revert towards its original shape. Therefore, the user must wear the orthokeratology lens each night to retain the required shape of the central cornea.

In addition to a correction region, orthokeratology lenses further comprise an annular vaulted region (sometimes referred to as a 'reverse curve' or 'return zone') surrounding the central correction region of the lens. This region is a recess in the posterior surface of the lens which accommodates an increase in tissue volume of a region of the cornea. The increase in tissue volume of the region of the cornea results from redistributed corneal tissue and/or fluid being directed to a peripheral portion of the cornea by the central correction region of the lens and causes an increase in curvature in the epithelial layer of the cornea. Thus, an annular vaulted region allows movement of corneal tissue and/or fluid away from the central region of the cornea and therefore assists in flattening a central portion of the cornea. An unavoidable consequence of the annular vaulted region is that the peripheral portion of the cornea to which the fluid and tissues is redistributed will be a single annulus of added plus power or a myopic defocus, surrounding the central flattened region of the cornea.

Although it has been shown that orthokeratology lenses may be effective in correcting for myopia, in contrast to MISIGHT type lenses, the corrected regions and added plus power regions of the cornea created by orthokeratology lenses are not well defined. The correction provided by the correction zone of an orthokeratology lens is not constant across the central portion of the cornea. It is also challenging to provide a constant add power across the peripheral annular region of the cornea that is aligned with the annular vaulted region, and the ring of add power induced in the cornea has traditionally been considered an unavoidable consequence of central flattening and not a specific design feature with controlled optics. Limited control over the myopic defocus and correction regions induced in the cornea by the orthokeratology lenses currently limit their efficacy in correcting existing myopia and slowing future progression.

A further problem with orthokeratology lenses is that the diameter of the corrected central portion of the cornea and the added plus power provided in the peripheral portion of the cornea will vary for different correction magnitudes. In general, the greater the amount of myopia, the smaller the diameter of the central correction portion of the cornea induced by the correction region of the lens and the greater the dioptric add provided in the peripheral portion of the cornea by the surrounding annular vaulted region. This effectively limits the degree of myopia that can be treated by conventional orthokeratology lenses and prevents the treatment from providing a controlled level of myopia control signal. In contrast, MISIGHT lenses have a constant central correction zone with a diameter fixed at 3.36 mm, regardless of the degree of myopia being treated and well controlled and stable myopia control treatment powers.

The present disclosure seeks to provide orthokeratology lenses which provide control over the diameter of the corrected central portion of the cornea being treated regardless of the level of myopia being treated. Such lenses may further provide a more constant power across the corrected central region of the cornea. Additionally or alternatively, such lenses may provide well defined regions of myopic defocus in the treated cornea.

SUMMARY

The present disclosure provides, according to a first aspect, an orthokeratology contact lens for correcting and slowing progression of myopia, wherein the lens is according to claim 1.

The present disclosure further provides, according to a second aspect, a method of manufacturing an orthokeratology lens, wherein the method is according to claim 10.

According to a third aspect, the present disclosure provides a method of manufacturing an orthokeratology contact lens, wherein the method is according to claim 11.

The present disclosure further provides, according to a fourth aspect, a method of treating myopia progression comprising providing a lens according to the first aspect to a subject in need thereof, wherein the method is according to claim 15.

Optional but preferred features are set out in the dependent claims.

It will of course be appreciated that features described in relation to one aspect of the present disclosure may be incorporated into other aspects of the present disclosure. For example, the method of preparing an orthokeratology contact lens according to the present disclosure may incorporate any of the features described with reference to an orthokeratology contact lens of the disclosure and vice versa.

DESCRIPTION OF THE DRAWINGS

Embodiments of the present disclosure will now be described by way of example only with reference to the accompanying schematic drawings of which.

DETAILED DESCRIPTION

Figure 1:
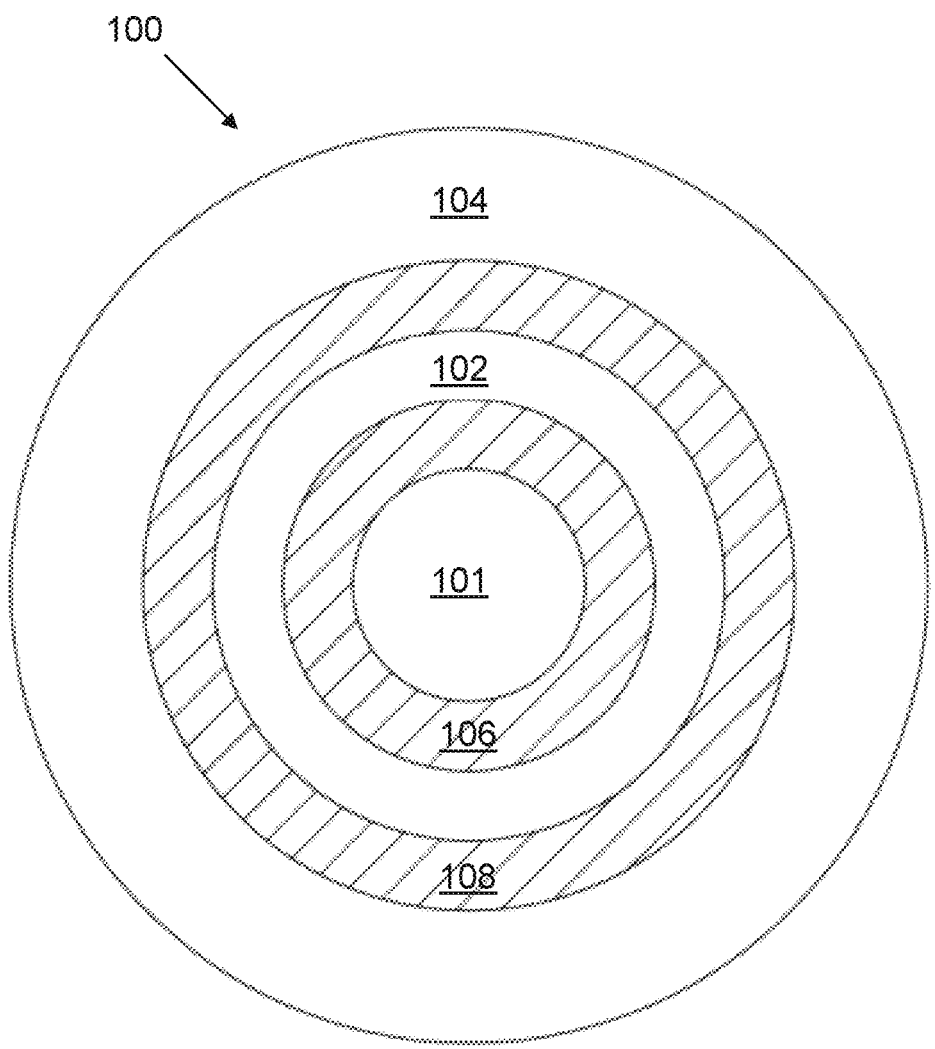
FIG. 1 is a plan view of a dual-focus lens 100 of the prior art.

According to a first aspect of the disclosure is an orthokeratology contact lens. The orthokeratology contact lens is for correcting and treating or slowing progression of myopia by reshaping a portion of the cornea of a myopic eye. The lens has a posterior surface for contacting with the portion of cornea to be reshaped. The posterior surface of the lens comprises a correction region for reducing the curvature of a central portion of the cornea. The correction region is defined by a first section of the posterior surface having a radius of curvature of 6 mm or greater. The posterior surface of the lens also comprises an annular treatment recess for inducing a myopic defocus in a peripheral portion of the cornea. The annular treatment recess extends radially outwards from a perimeter of the correction region and is defined by a second section of the posterior surface having a radius of curvature less than the radius of curvature of the first section, and wherein the radius of curvature of the second section defining the annular treatment recess is such that the annular treatment recess is configured to induce a myopic defocus of at least +1 D in the peripheral portion of the cornea. The posterior surface of the lens also comprises a regulating region for regulating the myopic defocus induced by the annular treatment recess. The regulating region extends radially outwards from a perimeter of the annular treatment recess and is defined by a third section of the posterior surface having a radius of curvature in the range from 4.5 mm to 15 mm.

According to a second aspect is a method of manufacturing an orthokeratology contact lens for correcting and treating myopia by reshaping a portion of the cornea of a myopic eye. The orthokeratology lens may be a lens according to the first aspect of the disclosure. The method comprises forming the posterior surface of the lens for contacting with the portion of cornea to be reshaped. The method comprises forming the first section of the posterior surface, wherein the first section defines the correction region and has a radius of curvature of 6 mm or greater. The method further comprises forming the second section of the posterior surface that extends radially outwards from a perimeter of the correction region. The second section defines the annular treatment recess and has a radius of curvature less than the radius of curvature of the first section. The radius of curvature of the second section is such that the annular treatment recess is configured to induce a myopic defocus of at least +1D in the peripheral portion of the cornea. The method further comprises forming a third section of the posterior surface that extends radially outwards from a perimeter of the annular treatment recess. The third section defines the regulating region and has a radius of curvature in the range from 4.5 mm to 15 mm. The first, second and third sections of the posterior surface of the lens may be formed sequentially or at the same time using a method disclosed herein.

As used herein, the term 'contact lens' or simply 'lens' refers to an ophthalmic lens that can be placed onto the anterior surface of the eye. An orthokeratology contact lens is a type of contact lens, the properties and features of which will be described herein. It will be appreciated that such a contact lens will provide clinically acceptable on-eye movement and not bind to the eye or eyes of a person. The contact lens is in the form of a corneal lens (e.g., a lens that rests on the cornea of the eye).

According to the present disclosure, the lens is an orthokeratology contact lens (also referred to as an 'Ortho-K lens'). It will be understood that reference to a 'lens' according to the present disclosure is a reference to an orthokeratology lens, unless another meaning is given. A traditional contact lens corrects myopia by reducing the convergence of incoming light from distant objects before it reaches the eye so that the location of the focus is shifted onto the retina. Thus, a traditional contact lens must be worn on the cornea to improve vision. In contrast, an orthokeratology lens according to the present disclosure alters the optical properties of the eye itself by gradually altering or reshaping the surface profile of the cornea of a subject during continued wear. The reshaping to the surface profile of the lens provides a temporary optical correction for the myopia.

The disclosed orthokeratology lenses, when worn, continuously exert a pressure on selected locations of the cornea to reshape the cornea into a desired surface profile. More particularly, an orthokeratology contact lens is worn on the cornea and primarily reshapes the epithelial layer of the cornea by altering the distribution of fluid and/or tissue in the epithelial layer. It will be understood that reference to fluid and/or tissue refers to any organic or physiological material in the epithelial layer of the cornea that may be moved by compressive forces applied to the surface of the cornea. For example, fluid of the epithelial layer of the cornea may include water and aqueous solutions of solutes typically found in the cornea, it may also include dispersions of organic material typically found in the cornea in aqueous solution. Tissue may refer to cells or groups of cells typically found in the cornea. An orthokeratology lens according to the present disclosure may reshape the cornea of an eye such that a cornea having a radius of curvature which converges incoming light from distant objects before it reaches the eye is reshaped to a cornea having a radius of curvature which reduces the convergence of light from distant objects so that the light is focused onto the retina. Mechanisms by which the corneal fluid and/or tissue may be redistributed are disclosed herein. The reshaped surface profile of the cornea may be retained after the orthokeratology contact lens is removed from contact with the cornea of the eye. The reshaped surface profile of the cornea may be retained for a prolonged period of time after the lens is removed from contact with the cornea so that long distance vision is retained for several hours, such as up to 5 hours, up to 8 hours, up to 12 hours, or up to 16 hours, or for a day or multiple days. Thus, the optical correction imparted by the orthokeratology lens is maintained in the cornea even after the lens has been removed.

The orthokeratology lens disclosed herein is for correcting and treating myopia. It will be understood that correcting myopia refers to changing the optical properties of the eye so that the degree of myopia of an eye is reduced or eliminated and vision is adequate without a correction device such as a traditional contact lens or spectacles, being needed. For example, an eye having a myope of between −0.25 D to −15 D may have a reduction of myopia by at least 0.25 D, by at least 0.5 D or preferably at least 0.75 D after a lens according to the present disclosure is worn. It may be that the orthokeratology lens is worn each night for one week to achieve a myopia refractive error correction sufficient that a traditional correction device such as a contact lens or spectacles, is not needed. Preferably, correction of myopia results in the eye no longer being myopic such that no external correction of vision (such as wearing spectacles or traditional contact lenses) is required for distance vision. Myopia may be corrected by the lens reducing the curvature of at least a central portion of the cornea. This may be achieved by orthokeratology lenses according to the mechanisms described herein. It will be understood that correction of myopia in a central portion of the cornea is required to correct long distance vision. However, a peripheral portion of the cornea may remain uncorrected or even have increased myopia ('myopic defocus') and not interfere with long distance vision. For example, orthokeratology lenses according to the present disclosure may correct myopia in a central portion of the cornea while under-correcting myopia or adding positive power in a peripheral portion of the cornea. Such under-correction or added positive power in a peripheral region may be described as introducing a myopic defocus into the eye.

It will be understood that reference to treating myopia means that the progression of myopia is slowed. It may be that treating myopia results in the progression of myopia being halted or reversed. This may be particularly advantageous in children where it is common for myopia to worsen as the child ages. It may be that an orthokeratology lens may be used to prevent onset of myopia in a subject at risk thereof. Without wishing to be bound by theory it is believed that a myopic defocus introduced into a peripheral region of the cornea by a lens according to the present disclosure may play a role in slowing the progression of myopia or preventing its onset. The annular treatment recess of the orthokeratology lens disclosed herein may induce a myopic defocus in the cornea through mechanisms disclosed herein.

The disclosed orthokeratology contact lenses may be rigid contact lenses which are constructed from a rigid material. The lenses may be rigid gas permeable lenses. The orthokeratology lenses may be made from poly methyl methacrylate (PMMA), or copolymers of a fluoro-methacrylate and a siloxanylstyrene, copolymers of fluorosilicone acrylate compounds, copolymers of silicone methacrylate compounds and fluorine methacrylate compounds. Examples of suitable lens materials include those having a US Adopted Name (USAN) of: tisilfocon A, tolofocon A, paflufocon A, paflufocon B, and paflufocon C. It will be understood that a rigid lens may be particularly effective for redistributing corneal fluid and/or tissue of the epithelial layer of the cornea because the rigid structure may impart a compressive force on the cornea surface that is sufficient to displace fluid and/or tissue from one region of the cornea to another region of the cornea.

The term "lens body" may be used to refer to the bulk of the lens and may in particular be used in reference to the section of lens bounded by the anterior and posterior surfaces. The lens body may be formed from multiple lens layers. A "lens layer" refers to a region of lens material forming at least a section of the lens body. If multiple lens layers are present, each lens layer will have a thickness less than the thickness of the lens body. Optionally, the lens body comprises a lens layer attached to at least one other layer. For example, multiple layers, such as at least two, or at least three lens layers may be stacked to form the lens body. If multiple lens layers are present, the lens layers may be formed from the same or different material. Optionally, at least two of the lens layers may be formed from the same material and at least one lens layer may be formed from an alternative material. If the lens body comprises multiple lens layers, it may be that there is a distinguishable boundary between each layer. For example, the lens body may be formed by curing a bulk material to form a first layer, and laying on top of the first layer further material which is then cured to form a second layer. If the first and second layer are formed from different materials, it will be obvious that a boundary exists where the chemical composition of the material changes from one layer to another. If the first and second lens layers are formed with the same material, there may be different physical properties between the layers, for example different optical properties or crystallinity at the boundary between the lens layers. It will be understood that when the lens is constructed from more than one lens layer, the posterior surface of the lens refers to the posterior surface of the bottommost layer, i.e., the layer that is in contact with the eye when the lens is worn. The anterior surface of the lens, when the lens is constructed from multiple layers, is to be understood as being the anterior surface of the uppermost layer of the lens i.e., the layer furthest from the surface of the eye when the lens is worn. The lens body may be formed from a single lens layer. It will be understood that if the lens body is formed from a single lens layer, the bulk material forming the lens body will be homogeneous such that there will be no distinguishable boundary between areas of the bulk material forming the lens body. When the lens body is formed by a single lens layer, the lens layer forms the entirety of the lens body, in which case the terms lens layer and lens body may be used interchangeably. It may be that a single lens layer forms the entirety of the lens.

The orthokeratology contact lens may be substantially circular in shape when viewed in plan and have a diameter in the range from 8 mm to 25 mm. Optionally, the diameter of the lens may be in the range from 8 mm to 15 mm.

Orthokeratology contact lenses according to the disclosure have an anterior surface and an opposing posterior surface. The anterior surface faces away from an eye when the contact lens is located on the eye, and the anterior surface can have a generally convex shape. The posterior surface is oriented towards the eye when the contact lens is located on the eye. The posterior surface can have a generally concave shape. The posterior surface of the lens contacts with the cornea of the eye. It will be understood that at least a major portion of the posterior surface may be in contact with the surface of the cornea when the lens is worn, for example at least 50%, at least 75% or at least 90%. Contact of the posterior surface of the lens with the cornea allows the lens to reshape the surface of the cornea as described herein.

The posterior surface of the orthokeratology lens comprises a correction region. The correction region is a region of the posterior surface of the lens that reduces the curvature of a central portion of the cornea, when the lens is worn. The lens is configured so that the correction region is positioned over the pupil of an eye when the lens is in use. Preferably, the correction region is located in the centre of the lens about the central axis of the lens when the lens is viewed in plan. The correction region aligns with a central portion of the cornea to be treated. Preferably, the correction region is substantially circular when viewed in plan.

The correction region is defined by a first section of the posterior surface having a radius of curvature greater than the radius of curvature of a central portion of a cornea. It will be understood that the greater the radius of curvature, the flatter the correction region.

The lens is configured such that when it is worn, the correction region comes into contact with the apex of the cornea and due to the central region having a flatter or less steeply curved profile than the apex of the cornea, results in a central portion of the cornea being flattened by compression. Thus, the correction region is configured to correct distance vision in a myope by flattening, or reducing the curvature of a central portion of the treated cornea. Without wishing to be bound by theory, it is thought that the correction region reduces the curvature of the central portion of the cornea by displacing epithelial fluid and/or tissue from the central portion of the cornea to a peripheral portion of the cornea. The central portion of the cornea will be moulded at least partially to, or be influenced by the profile of at least a portion of the correction region of the lens when the orthokeratology lens is worn. Thus, the topography of the central portion of the cornea will be flatter after the lens has been worn, than before the lens is worn.

To resolve the refractive error of a myopic eye, a central portion of cornea requires flattening, or to be made less curved. The minimum radius of curvature required for the correction region of the lens can be approximated to the radius of curvature required to correct a low myope, such as a myope of −0.25 D. An eye with a higher degree of myopia will require greater flattening and thus must have a correction region with a radius of curvature greater than the radius of curvature of the correction region required for a lower myope. Thus, a maximum radius of curvature of the correction region may be approximated to the radius of curvature required to correct a high myope, such as a myope of −15 D.

The correction region is defined by a first section of the posterior surface of the lens having a radius of curvature of 6 mm or greater, such as a radius of curvature of 7 mm or greater, or a radius of curvature of 8 mm or greater. The correction region may be defined by a first section of the posterior surface of the lens having a radius of curvature of less than 15 mm, less than 12 mm or less than 10 mm. The radius of curvature of the correction region may be in the range from 6 mm to 15 mm, from 6 mm to 12 mm, from 6 mm to 10 mm, from 6 mm to 9.5 mm, from 7 mm to 9.5 mm, from 7 mm to 9 mm, from 8 mm to 8.5 mm, from 8.8 mm to 9.3 mm, from 6 mm to 6.8 mm, or from 6.8 mm to 15 mm. Optionally, the radius of curvature of the correction region may be in the range from 6 mm to 9.9 mm. When treating a relatively low myope, e.g., a myope of −1.0 D, it may be advantageous to have a correction region with a radius of curvature in the range from 7 mm to 9.5 mm. When treating a relatively high myope, e.g., a myope of −4.0 D or greater, it may be advantageous to provide a correction region defined by a portion of the posterior surface of the lens having a radius of curvature in the range from 6.8 mm to 15 mm.

It may be that the correction region provides an additional correction, over and above that required to correct the myopia. This overcorrection accounts for the gradual reversal of the profile of the cornea to its untreated state during the course of the day, when the lens is no longer being worn. For example, an over-correction of about −0.75 D may be induced by the correction region to allow for the partial reversion of the central portion of the cornea to its natural, more curved state when the lens is not being worn. This overcorrection is known as a Jessen Factor. The overcorrection may be greater than −0.5 D or greater than −1 D or greater than −2 D. It may be that overcorrection extends the period of time the cornea will retain focused long distance vision when the lens is not being worn. It may also be that an overcorrection increases the volume of fluid and/or cells moved into the peripheral portion of the cornea because the central portion of the cornea will become flatter. This may help control the amount of myopic defocus induced by the annular treatment recess as there is a greater volume of fluid and/or cells to be redistributed within the cornea.

The correction region may have a diameter of more than 1 mm, more than 2 mm, or more than 3 mm. The correction region may have a diameter of less than 8 mm, less than 6 mm, less than 5 mm, or less than 4 mm. The correction region may have a diameter in the range from 1 mm to 8 mm, 2 mm to 6 mm, more preferably 2.5 mm to 5.5 mm, and most preferably in the range from 3 mm to 4 mm. In preferred embodiments, the correction region has a diameter of about 3 mm, for example a diameter of 3.36 mm.

The correction region may be defined by a first section of the posterior surface of the lens that is spherical. Alternatively, the correction region may be defined by a first section of the posterior surface of the lens that is aspherical. It will be understood that an aspherical profile is one in which the radius of curvature is not constant across the section of posterior surface corresponding to the diameter of correction region. For example, the radius of curvature of the centre of the correction region may be greater than the radius of curvature at either end, or both ends of the correction region. Alternatively, the radius of curvature of the centre of the correction region may be less than the radius of curvature at either end, or both ends of the correction region. The radius of curvature may increase towards the edge of the correction region. Alternatively, the radius of curvature may decrease towards the edge of the correction region. An aspherical correction region may be advantageous in achieving a more constant base power across the central portion of the cornea because the degree of flattening may be reduced with radial distance from the apex of the cornea. Optionally, the correction region may be defined by a first section of the posterior surface arranged for treating astigmatism. For example, the profile of the posterior surface of the correction region may be toric.

The posterior surface of the lens further comprises an annular treatment recess that extends radially outward from a perimeter of the correction region. The lens is configured so that the annular treatment recess, together with the correction region, aligns with the pupil of the eye when the lens is in use. When the lens is viewed in plan, the central correction region is centred about the central axis of the lens and the annular treatment recess surrounds the central correction region. When the lens is worn, the annular treatment recess aligns with a peripheral portion of the cornea to be treated. Preferably, the annular treatment recess is substantially circular when viewed in plan.

The annular treatment recess induces a myopic defocus in the peripheral portion of the cornea and is defined by a second section of the posterior surface having a radius of curvature less than the radius of curvature of the first section of the posterior surface (i.e., the correction region). Because the radius of curvature of the annular treatment recess is less than the radius of curvature of the correction region, the annular treatment recess is more curved and provides an add power to the treated cornea. It will be understood that the shorter the radius of curvature of the second section of the posterior surface of the lens, the more curved the annular treatment recess and the greater the add power. The annular treatment recess is formed in the posterior surface of the lens which is a concave surface.

When the lens is in use, the annular treatment recess accommodates an increase in thickness and in curvature of a peripheral portion of the cornea. The increased thickness/curvature results from the pressure increase within the central region of cornea (caused by the correction region of the lens) causing the redistribution of fluid and/or tissue to the peripheral portion. It will be understood that the surface of the cornea takes on a profile influenced by the profile of the posterior surface of the lens, because the surface of the cornea is compressed to at least partially conform to the shape of the lens posterior surface. Thus, the peripheral portion of the cornea that aligns with the annular treatment recess will be shaped by the annular treatment recess when the lens is worn and will have added (convex) curvature. The shaped peripheral portion of the cornea will add positive power or myopic defocus to the cornea. The annular treatment recess controls the shape of the peripheral portion of the cornea that provides the myopic defocus in the treated eye. It will be understood that the shape of the peripheral portion of the cornea will not necessarily match that of the shape of the annular treatment recess, for example, the peripheral portion of the cornea may only partially fill the annular treatment recess when the lens is worn.

The correction region of the lens changes the central corneal curvature and provides a power to the central portion of the cornea by flattening that region. The annular treatment recess provides an under-correction of distance vision or deliberately induces a myopic defocus in the cornea. The radius of curvature of the second section of the peripheral portion of the lens will be such that the annular treatment recess induces a myopic defocus of at least +1 D in the peripheral portion of the treated cornea over the resulting power of the flattened central portion of the cornea. It will be understood that a dioptre, D is a unit of measurement of a lens's refractive power and is a common term in the art. The add power provided by the annular treatment recess in the peripheral portion of the cornea may be at least +1.5 D, at least +2.0 D, at least +4.0 D, at least +6.0 D, at least +8.0 D, or at least +12.0 D over the resulting power of the flattened central portion of the cornea. The add power provided by the annular treatment recess in the peripheral portion of the cornea may be less than +12.0 D, less than +8.0 D, or less than +6.0 D. For example, the add power provided by the annular treatment recess in the peripheral portion of the cornea may be at least +1.0 D but less than +12.0 D. This is achieved by control of the curvature of the annular treatment recess. The annular treatment recess may also assist in creating a uniform corrected region in the central portion of the cornea by accommodating at least some of the fluid and/or tissue displaced from the central portion of the cornea. As will be disclosed herein, the width, depth, curvature and location of the annular treatment recess may influence the amount of redistributed fluid and/or tissue accommodated into the peripheral portion of the cornea.

The annular treatment recess induces a myopic defocus in a peripheral portion of the cornea by allowing the curvature of the cornea to be flattened less, remain unflattened, or increase in the peripheral portion of the cornea located beneath the annular treatment recess when the lens is worn. The radius of curvature of the annular treatment recess will be selected depending on the degree of flattening or increase in curvature required in the peripheral portion of the cornea. The peripheral portion of the cornea will not be fully corrected for long distance vision. Thus, a deliberate undercorrection, or myopic defocus is introduced into the cornea in the peripheral portion. Without wishing to be bound by theory, it is thought that the myopic defocus induced in a peripheral portion of the cornea contributes to the slowing of myopia progression. The dimensions of the annular treatment recess may be modified to control the amount of myopic defocus induced and the location of the cornea where the defocus is to be induced.

At the annular treatment recess, in the direction of the thickness of the lens, the lens comprises the recess and a residual portion of lens material having a surface defining the closed end of the recess. The surface defining the closed end of the recess is the second section of the posterior surface of the lens. The second section of the posterior surface of the lens has a curvature that defines the curvature of the recess.

The depth of the recess is defined as the distance from the open end of the recess (i.e., the posterior surface that would be present were the recess not there) to the closed end of the recess (i.e., the surface of the lens material that defines the end of the recess). The one or more recesses may be of a depth of between 3% and <100% of the thickness of the residual portion of lens material, for example the recess may be of a depth of between 10% and 80%, between 20% and 60%, or between 30% and 50% the thickness of the residual portion.

The radius of curvature of the second section of the posterior surface of the lens defining the annular treatment recess may be in the range from 5.5 mm to 12 mm, for example in the range from 6.5 mm to 12.0 mm, from 7.5 mm to 9.0 mm, from 8.0 mm to 9.0 mm, from 5.5 mm to 8.5 mm, from 7.5 mm to 8.5 mm, or from 8.5 mm to 9.5 mm. The curvature of the second section of the posterior surface defining the annular treatment recess may be chosen in dependence on the curvature of the correction region. For example, when the radius of curvature of the first section of the posterior surface of the lens defining the correction region is in the range from 8.0 mm to 8.5 mm, the radius of curvature of the second section of the posterior surface defining the annular treatment recess may be in the range from 7.7 mm to 8.2 mm. When the radius of curvature of the first section of the posterior surface of the lens defining the correction region is in the range from 8.8 mm to 9.3 mm, the radius of curvature of the second section of the posterior surface defining the annular treatment recess may be in the range from 8.3 mm to 8.8 mm. The flatter (less curved) the correction region, the greater the amount of corneal fluid and/or tissue that will be displaced by the lens and it may be that a more curved annular treatment recess is needed. Alternatively, it may be that in a relatively high myope the correction region will be flatter than for a low myope, but because the surface profile of the peripheral portion of the cornea pre-treatment is already highly curved, the annular treatment recess may have a radius of curvature equal to or even less than the radius of curvature of the peripheral portion of the cornea pre-treatment in order to preserve or flatten the peripheral portion to obtain the desired myopic defocus. The radius of curvature of the second portion of the posterior surface of the lens defining the annular treatment recess will be less than the radius of curvature of the first portion of the posterior surface of the lens defining the correction region.

The annular treatment recess may have a width in the range from 0.5 mm to 5.5 mm, from 1 mm to 4 mm, for example in the range from 1 mm to 2 mm. It will be understood that, as the treatment recess is annular, the width may be defined as being the distance between the perimeter of the inner edge of the recess and the outer edge of the recess (when the lens is viewed in plan) in a direction of travel from the centre of the lens to the edge of the lens.

The annular treatment recess may be either symmetrical or asymmetrical, that is the recess is defined by the second section of the posterior surface of the lens that has either a symmetrical or asymmetrical profile. The annular treatment recess may be defined by the second section of the posterior surface of the lens that is spherical. Alternatively, the annular treatment recess may be defined by the second section of the posterior surface of the lens that is aspherical. The shape of the recess may impart specific optical power in the portion of the cornea that aligns with the recess of the lens. The annular treatment recess may be asymmetric such that a portion of the annular treatment recess located closest to correction region has a radius of curvature less than a portion of the annular treatment recess located farther from the correction region. It will be understood that such an asymmetric profile tilts the annular treatment recess towards the correction region. Alternatively, the annular treatment recess may be asymmetric such that a portion of the annular treatment recess located closest to the correction region has a radius of curvature greater than a portion of the annular treatment recess located farther from the correction region. It will be understood that such an asymmetric profile tilts the annular treatment recess away from the correction region. The tilt of the annular treatment recess may help to direct tissue and/or fluid towards or away from the central portion of the cornea aligned with the correction region. The radius of curvature of the annular treatment recess may depend on the radius of curvature of the correction region.

The lens further comprises a regulating region which extends radially outwards from a perimeter of the annular treatment recess. Thus, it will be understood that the regulating region is also annular, or generally annular, when viewed in plan and is centred about the central axis of the lens. The regulating region regulates the myopic defocus induced in the peripheral portion of the cornea by the annular treatment recess and central correction region. The regulating region regulates the increase in curvature of the cornea in the peripheral portion resulting from the pressure increase within the cornea caused by the redistribution of fluid and/or tissue towards the peripheral portion, and it controls the movement of fluid and/or tissue from the corneal far periphery to the peripheral portion of the cornea aligned with the annular treatment recess, as will be explained herein. The regulating region may additionally or alternatively assist in achieving a central portion of the cornea with uniform power across its diameter. For example, the regulating region may act as an additional recess for accommodating an increase in curvature of the cornea in the peripheral portion resulting from the pressure increase within the cornea caused by the redistribution of fluid and/or tissue towards the peripheral portion. The regulating region may be located outside of the optic zone so as not to interfere with the vision of a user. It may be that the regulating region does not overlay with the pupil of the eye when the lens is in use.

The regulating region has a radius of curvature defined by a third section of the posterior surface of the lens having a curvature providing a power in the range from 12 dioptres greater than the radius of curvature of the correction region to 12 dioptres less than the radius of curvature of the correction region. For example, the third section of the posterior surface of the lens defining the regulating region may have a curvature providing a power in the range from 0 to 12 dioptres greater than the radius of curvature of the correction region, from 0 to 8 dioptres greater than the radius of curvature of the correction region, or from 0 to 4 dioptres greater than the radius of curvature of the correction region. Alternatively, the third section of the posterior surface of the lens defining the regulating region may have a curvature providing a power in the range from 0 to 12 dioptres less than the radius of curvature of the correction region, from 0 to 8 dioptres less than the radius of curvature of the correction region, or from 0 to 4 dioptres less than the radius of curvature of the correction region.

The radius of curvature of the third section of the posterior surface of the lens defining the regulating region may be in the range from 4.5 mm to 15 mm, for example from 4.5 mm to 12 mm, from 7 mm to 15 mm, or from 7 mm to 9 mm. The regulating region may have a width in the range from 0.5 mm to 5.5 mm, from 1 mm to 4 mm, for example the width may be in the range from 1 mm to 2 mm. It may be that the radius of curvature of the third section is equal to the radius of curvature of the second section defining the correction region. It may be that the radius of curvature of the third section is greater than the radius of curvature of the second section defining the correction region, for example greater by at least 0.9 mm. It may be that the radius of curvature of the third section is less than the radius of curvature of the second section defining the correction region, for example greater by at least 0.9 mm. It will be understood that, as the regulating region is annular, the width may be defined as being the distance between the perimeter of the inner edge of the regulating region and the outer edge of the region (when the lens is viewed in plan) in a direction of travel from the centre of the lens to the edge of the lens.

The regulating region may be symmetrical, that is the regulating region may be defined by a third section of the posterior surface of the lens that has a symmetrical profile. The regulating region may be asymmetric, that is the regulating region may be defined by a third section of the posterior surface of the lens that has an asymmetrical profile. The regulating region may be defined by a third section of the posterior surface of the lens that is spherical. Alternatively, the regulating region may be defined by a third section of the posterior surface of the lens that is aspherical. The shape of the regulating region may impart specific optical power in the lens. The regulating region may be asymmetric such that a portion of the regulating region located closest to the annular treatment recess has a radius of curvature less than a portion of the regulating region located farther from the annular treatment recess. It will be understood that such an asymmetric profile tilts the regulating region towards the annular treatment recess and correction region. Alternatively, the regulating region may be asymmetric such that a portion of the regulating region located closest to the annular treatment recess has a radius of curvature greater than a portion of the regulating region located farther from the annular treatment recess. It will be understood that such an asymmetric profile tilts the regulating region away from the annular treatment recess and correction region. This may help to direct tissue and/or fluid towards or away from the portion of the cornea aligned with the annular treatment recess as necessary. The radius of curvature of the regulating region may depend on the radius of curvature of the correction region.

In some embodiments the radius of curvature of the regulating region is less than the radius of curvature of the correction region. In such embodiments, the regulating region may act to accommodate fluid and/or tissue displaced by the correction region that is not accommodated by the annular treatment recess of the lens. This may be particularly advantageous when the degree of myopia being corrected is relatively high e.g., a −4.00 D myope. In such an example, a relatively large amount of flattening of the central portion of the cornea is required and thus a large volume of tissue and/or fluid is displaced by the correction region of the lens. The volume of displaced tissue and/or fluid may be greater than that needed to cause the desired myopic defocus in the peripheral portion of the cornea. It is desired to avoid that excess displaced tissue and/or fluid from accumulating in the peripheral portion of the cornea as this would induce added power over and above that desired in that region of the cornea. To help achieve the desired amount of myopic defocus in the peripheral portion of the cornea in a well-defined region, the regulating region may act as a reservoir for accommodating the excess displaced tissue and/or fluid. In this case, the regulating region is a region of the lens into which the curvature of the cornea may expand. The regulating region in such an embodiment may therefore be considered to be a second recess and may have any of the features disclosed in relation to the annular treatment recess. The regulating region in such an embodiment may induce a second myopic defocus into the cornea.

Optionally, the orthokeratology lens comprises a correction region defined by a first section of posterior surface of the lens with a radius of curvature in the range from 6.8 mm to 15.0 mm, and, the radius of curvature of the third section of posterior surface defining the regulating region is in the range from 4.5 mm to 15 mm and is less than the radius of curvature of the first section of the posterior surface defining the correction region. Optionally, the radius of curvature of the second section of the posterior surface of the lens defining the annular treatment recess is in the range from 6.5 mm to 12.0 mm, provided the radius of curvature is less than the radius of curvature of the correction region. Optionally, the radius of curvature of the third section of the posterior surface of the lens defining the regulating region is less than the radius of curvature of the second section defining the annular treatment recess. For example, when the radius of curvature of the first section of the posterior surface of the lens defining the correction region is in the range from 8.8 mm to 9.3 mm, the radius of curvature of the second section of the posterior surface defining the annular treatment recess may be in the range from 8.3 mm to 8.8 mm, and the radius of curvature of the third section of the posterior surface defining the regulating region may be in the range from 7.9 mm to 8.4 mm. Such a lens may be particularly effective in correcting and treating a high myope, such as a myope of at least −4.0 D.

In some embodiments, the radius of curvature of the regulating region is greater than or equal to the radius of curvature of the correction region. In such embodiments, the regulating region may act to direct fluid and/or tissue displaced by the correction region towards the portion of the cornea aligned with the annular treatment recess of the lens. This may be particularly advantageous when the degree of myopia being corrected is relatively low e.g., a −1.0 D myope. In such an example, a relatively small amount of flattening of the central portion of the cornea is required and thus a small volume of tissue and/or fluid is displaced by the correction region of the lens. To ensure that the annular treatment recess is able to induce a sufficient myopic defocus in a peripheral portion of the cornea, the greater (more flat) radius of curvature of the regulating region may help to direct tissue and/or fluid towards the region of the cornea aligned with the correction region. It may be that when the regulating region is relatively flat it does not act as a reservoir in which the cornea may expand and so movement of fluid and/or tissue from the central portion of the cornea and/or the peripheral portion of the cornea towards the region aligned with the regulating region is discouraged.

Optionally, the orthokeratology lens comprises a correction region defined by a first section of the posterior surface having a radius of curvature in the range from 7 mm to 9.5 mm, and a second section of posterior surface defining the annular treatment recess having a radius of curvature in the range from 5.5 mm to 8.5 mm, provided the radius of curvature is less than the radius of curvature of the central correction region. Optionally, the radius of curvature of the regulating region is in the range from 7.0 mm to 15 mm and the radius of curvature of the third section is greater than the radius of curvature of the second section defining the annular treatment recess. Optionally, the radius of curvature of the regulating region is greater than or equal to the radius of curvature of the correction region. For example, when the radius of curvature of the first section of the posterior surface of the lens defining the correction region is in the range from 8.0 mm to 8.5 mm, the radius of curvature of the second section of the posterior surface defining the annular treatment recess may be in the range from 7.7 mm to 8.2 mm, and the radius of curvature of the third section of the posterior surface defining the regulating region may be in the range from 8.0 mm to 8.5 mm. Such a lens may be particularly effective in correcting and treating a low myope, such as a myope of around −1.0 D.

The regulating region may be positioned in the posterior surface of the lens so that it is tilted either toward or away from the centre of the correction region. It will be understood that a tilt may be created in the regulating region by creating an asymmetric profile in the third section of the posterior surface of the lens. The regulating region may be asymmetric such that a portion of the regulating region located closest to the annular treatment recess has a radius of curvature less than a portion of the regulating region located farther from the annular treatment recess. It will be understood that such an asymmetric profile tilts the regulating region towards the annular treatment recess and correction region. Alternatively, the regulating region may be asymmetric such that a portion of the regulating region located closest to the annular treatment recess has a radius of curvature greater than a portion of the regulating region located farther from the annular treatment recess. It will be understood that such an asymmetric profile tilts the regulating region away from the annular treatment recess and correction region. The direction of the tilt of the regulating region may be selected according to the desired direction of flow of tissue and/or fluid in the cornea. For example, in a lens designed to treat a low myope (e.g., a −1.0 D myope), the regulating region may be tilted away from the annular treatment recess and correction region. This may direct corneal fluid and/or tissue towards the portion of the cornea bounded by the annular treatment recess and correction region and/or prevent fluid and/or tissue moving towards an outer region of the cornea which may be bound by a fitting region. In such an arrangement, it may be that more fluid and/or tissue is available to align with the annular treatment recess and/or correction region which may help the desired corneal profile be achieved in these regions. In a lens designed to treat a high myope (e.g., a −4.0 D myope), the regulating region may be tilted towards the annular treatment recess and correction region. This may direct corneal fluid and/or tissue towards an outer region of the cornea which may be bound by a fitting region and/or away from the portion of the cornea bounded by the annular treatment recess and correction region. If the regulating region is tilted towards the annular treatment recess and correction region, it may be that corneal fluid and/or tissue directed from the central portion of the cornea is directed towards an outer region of the cornea which may be aligned with a fitting region. It may also be that such as arrangement prevents back-flow of corneal tissue and/or fluid from the outer region of the cornea towards the central region. Such a configuration in the lens may allow excess corneal fluid and/or tissue to be directed away from the annular treatment recess so that the desired myopic defocus in the peripheral portion of the lens may be controlled.

Lenses according to the disclosure may optionally comprise a regulating region that directly abuts the annular treatment recess i.e., an outer perimeter of the annular treatment recess may define a boundary between the annular treatment recess and the regulating region. The treatment recess may therefore be adjacent to the regulating region. At the boundaries between the adjacent regulating region and annular treatment recess, there may be a sharp, discontinuous increase or decrease in radial curvature power, depending upon the relative radial curvature add powers of the annular treatment recess and regulating region respectively.

It may be that the radius of curvature of the regulating region is equal to the radius of curvature of the annular treatment recess. In such an embodiment, the regulating region and annular treatment recess may be spaced apart in the lens such that there is a clear definition between the end of one region and the beginning of another. For example, a portion of posterior lens having a radius of curvature equal to that of the correction region may separate the annular treatment recess and the regulating region.

It may be that a further one or more regions are located between the annular treatment recess and the correction region. Such regions may direct tissue and/or fluid towards the peripheral portion of the cornea located below the annular treatment recess when the lens is in use. For example, the region can have properties similar to the regulating region described herein, except it is located on the opposite side of the treatment recess i.e., it aligns with the inner perimeter of the annular treatment recess. Or, such regions may divert tissue and/or fluid away from the portion of the cornea located below the annular treatment recess when the lens is in use. For example, the region can have properties similar to the annular treatment recess.

Optionally, the posterior surface of the lens may further comprise a fitting region for stabilising the lens to the cornea, wherein the fitting region extends radially outwards from a perimeter of the regulating region. Thus, the lens according to the present disclosure may comprise a fitting region for stabilising the lens.

The fitting region is a part of the lens outside of the optic zone, thus the fitting region does not align with the pupil of the eye when the lens is in use, but rather is outside of the peripheral portion of the cornea. When the lens is viewed in plan, the fitting region is centred about the central axis of the lens and surrounds the regulating region. Preferably, the fitting region is substantially circular when viewed in plan. The fitting region does not have optical properties but is instead used to anchor the lens to the eye when in use. This may help to avoid the lens moving or slipping on the eye when in use. Optionally, the fitting region has a radius of curvature approximate to the radius of curvature of a portion of the eye to be treated. The fitting region may have multiple regions, each region having a different radius of curvature. Each region may have a radius of curvature in the range from 8 mm to 12 mm, preferably from 8.5 mm to 10.5 mm, for example the radius of curvature may be about 9 mm. It may be that the fitting region is rigid so that it does not flex or morph under the pressure of fluid being redistributed within the cornea. In this way, the fitting region assists in directing fluid/cells into the region of the cornea aligned with the annular region. Optionally, the fitting region may have a radius of curvature greater than a portion of the cornea which aligns with the fitting region when the lens is in use. In this way, the fitting region may apply an additional pressure to the eye (for example, an additional pressure is applied by the fitting region to the side of the cornea). This may be beneficial in redistributing corneal tissue and/or fluid towards the centre of the cornea, which may be preferable in a lens designed to treat a relatively low myope. Alternatively, the fitting region may have a radius of curvature less than a portion of the cornea which aligns with the fitting region when the lens is in use. Such a fitting region will be more curved than the portion of cornea with which the fitting region aligns and so the fitting region may not apply an additional pressure to the cornea. This may allow the eye to expand in the region aligned with the fitting region (i.e., the side of the cornea), which may be preferable in a lens designed to treat a relatively high myope. The fitting region may have a width of at least 1 mm, or at least 2 mm, or at least 4 mm. The fitting region may have a width of no more than 9 mm, no more than 7 mm, or no more than 5 mm. For example, the fitting region may have a width in the range from 1 mm to 7 mm, such as 1.5 mm. It will be understood that, as the fitting region is annular, the width may be defined as being the distance between the perimeter of the inner edge of the fitting region and the outer edge of the fitting region (when the lens is viewed in plan) in a direction of travel from the centre of the lens to the edge of the lens.

Optionally, the lens comprises an edge lift. The edge lift may assist the user in lifting the lens from the cornea.

A method of forming an orthokeratology lens according to the present disclosure may include any of the features set out above.

Orthokeratology lenses according to the disclosure may optionally reshape the profile of a cornea to mimic the core properties of a MISIGHT contact lens. That is, the lens may provide a corneal profile comprising a central correction zone (the central portion of the cornea that has been flattened) having a diameter of 3.30-3.40 mm and a raised peripheral portion (the peripheral portion of the cornea which has had an increase in curvature or myopic defocus) which provides an add power of +2.0 D, and which optionally has a diameter of 1.40-1.50 mm.

The lens may be formed by cast molding processes, spin cast molding processes, or lathing processes, or a combination thereof. As understood by persons skilled in the art, cast molding refers to the molding of a lens by placing a lens forming material between a female mold member having a concave lens member forming surface, and a male mold member having a convex lens member forming surface.

The method of manufacturing may comprise forming a female mold member with a concave lens forming surface and a male mold member with a convex lens forming surface. The method may comprise filling a gap between the female and male mold members with bulk lens material. The method may further comprise curing the bulk lens material to forms the lens. It will be understood that the posterior and anterior surfaces of the lens will conform to the concave and convex surfaces and the mold and thus the profile of the lens surfaces are controlled by the profile of the mold surfaces.

At least one of the annular treatment recess and the regulating region may be formed in the lens layer by lathing, etching or lasering the recess or region into the lens layer. A lens body having a posterior surface may first be formed without at least one of the annular treatment recess and the regulating region, for example in a mold. It may be that the posterior surface of the lens body forms the posterior surface of the lens once the annular treatment recess and the regulating region have been formed. The lens body may have a substantially uniform radius of curvature across the posterior surface. It may be that the radius of curvature across the entire posterior surface is equal to the radius of curvature of the correction region. The method then comprises forming the second section of the posterior surface defining the annular treatment recess and/or the third section of the posterior surface defining the regulating region, using a lathe, etching or lasering to remove a portion of the lens body. In this way, once the lens body has been formed, a portion of the lens body may be removed using a lathe, etching or lasering to form the desired lens having a posterior surface according to the present disclosure. This technique may be used to change the curvature of a section, or multiple sections of the posterior surface of the lens body and thus create the annular treatment recess or the regulating region in the posterior surface. The resulting lens will have a posterior surface according to the present disclosure.

Alternatively or additionally, at least one of the annular treatment recess and the regulating region may be formed in the lens layer by use of a mold. Optionally, the surface of the mold may define at least one of the first section of the posterior surface defining the correction region, the second section of the posterior surface defining the annular treatment recess, and the third section of the posterior surface defining the regulating region of the lens. It may be that the mold defines the correction region of the lens, and the annular treatment recess and regulating region is formed by another process disclosed herein such as lathing, etching or lasering. The mold may comprise one or more protrusions for defining at least one of the correction region, the annular treatment recess or regulating region. The shape and curvature of the protrusion will define the radius of curvature of the section of posterior surface of the lens defining the annular treatment recess or regulating region.

At least one of the annular treatment recess and the regulating region may additionally or alternatively be formed by holding the lens in place while an impression forming arm is pressed into the posterior surface of the lens. This may be done multiple times, with impression arms of different diameters to form different sized impressions in the posterior surface of the lens. The shape and curvature of the impression forming arm will define the radius of curvature of the section of posterior surface of the lens defining the annular treatment recess of regulating region.

The skilled person will appreciate that the order of the steps as set out in the method of the first aspect, or any other aspect of the disclosure, are not limited to the order presented.

According to a third aspect of the disclosure is a method of manufacturing an orthokeratology contact lens,
wherein the lens comprises a posterior surface having multiple sections, each section having a radius of curvature, wherein a first section defines a correction region of the lens, a second section defines an annular treatment recess of the lens, and a third radius section defines a regulating region of the lens;
the method comprising selecting a radius of curvature for each section by:
i) selecting a radius of curvature of the first section, wherein the radius of curvature of the first section is at least 6 mm,
ii) selecting a radius of curvature of the second section, wherein the radius of curvature of the second section is less than the radius of curvature of the first section; and,
iii) selecting a radius of curvature of the third section, wherein the radius of curvature of the third section is in the range from 4.5 mm to 15 mm; and,
iv) manufacturing the lens so that the posterior surface has multiple sections having the radii of curvatures selected in steps i), ii) and iii) respectively.

It will be understood that any feature of the first or second aspect of the disclosure may be combined with the third aspect of the disclosure. For example, the method according to the third aspect may be used to manufacture a lens according to the first aspect. The correction region, annular treatment recess and regulating region of the third aspect of the disclosure may have any feature described in relation to the first or second aspect of the disclosure. Furthermore, the method of the third aspect of the disclosure may include any feature of the second aspect of the disclosure. For example, the lens may be formed in a mold. Optionally, at least one of the annular treatment recess and the regulating region may be formed by lathing.

According to a fourth aspect of the disclosure is a method of treating myopia progression comprising providing a lens according to the present disclosure to a subject in need therefore. It will be understood that the subject is a person who has myopia and the method comprises treating the myopic eye or eyes of the person. The subject may be under the age of 25 years. The subject may be under the age of 20 years, or under 15 years. The subject may be under the age of 12 years. Orthokeratology lenses according to the present disclosure may be particularly advantageous for treating myopia in children under 12 years of age. It may be that in a child of under 12 years of age, myopia has not yet developed or is only mild and so it is easy to slow or prevent its progression or worsening. It may be that use of orthokeratology lenses according to the present disclosure is particularly effective in preventing myopia developing, or at least slowing the progression of myopia in a subject having a family history (i.e., a genetic disposition) of developing myopia.

The method of treating myopia progression may comprise reshaping the cornea of the subject by fitting the lens according to the disclosure to the cornea of the subject. The method may correct myopia such that the subject had clear long distance vision when the lens is removed from the eye. The method may induce a myopic defocus in a peripheral region of the cornea as described herein. For example, the method may induce a myopic defocus of at least +1 D, at least +1.5 D, at least +2 D, at least +4 D, at least +6 D or at least +8 D in the cornea. The radius of the corrected region of the cornea and the myopic defocus region of the cornea may be defined by the correction region and treatment recess of the lens respectively. For example, a correction region in a lens having a diameter of about 3 mm may induce a correction in the central portion of the cornea of about 3 mm in diameter.

Once fitted to the subject's eye, the lens may be worn for a sufficient time for the shape of the cornea to conform to the shape of the lens, or at least substantially conform to the shape of the lens. For example, the lens may be worn for at least 5 hours, or at least 8 hours. Preferably, the lens is worn overnight when the subject is asleep so that the cornea of the eye may be reshaped whilst the subject is not in need of their vision. Once the cornea has been reshaped so that the cornea has a profile substantially the same as the posterior surface of the lens, the lens may be removed. The reshaped profile of the cornea may endure for several hours, for example at least 5 hours, at least 8 hours or at least 12 hours. Thus, the subject's long distance vision is enhanced over the eyes natural state (i.e. the vision of the subject before it was treated with the lens. Once the lens is removed from the eye, compressive forces are no longer being exerted on the cornea and so the cornea will revert towards its natural state. The lens may be re-worn to reshape the cornea again. Thus, the subject may wear the lens each night, whilst removing the lens during the day.

The present disclosure seeks to control the location and power characteristics of the myopic defocus created in a peripheral portion of the cornea by the corrective flattening of the central portion of a cornea. Additionally, or alternatively, the present disclosure seeks to control the dimensions and curvature of the corrected central portion of the cornea. This may be achieved by use of an annular treatment recess and a regulation region in an orthokeratology lens as described herein.

Figure 2A:
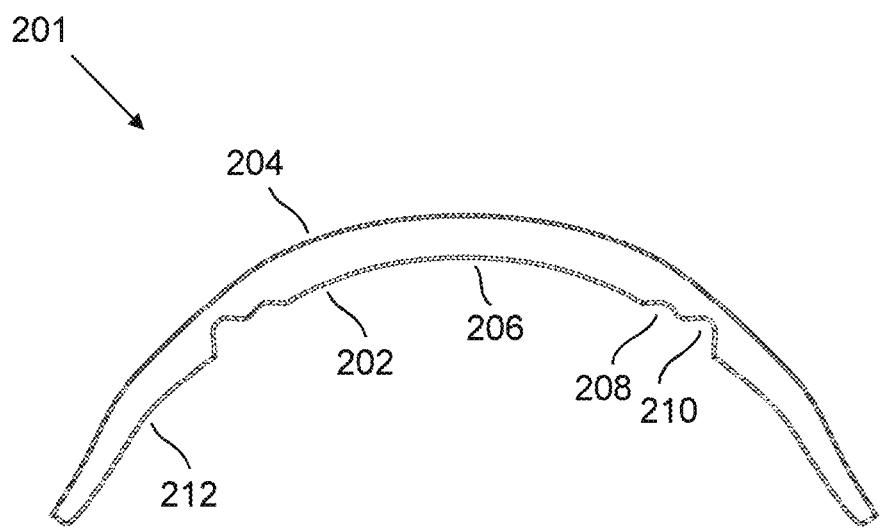
FIG. 2A is a cross-sectional view of a lens 201 according to the disclosure, taken along axis A-A' of FIG. 2B. The lens 201 is suitable for treating or slowing progression of myopia in a relatively high myope.

An orthokeratology contact lens 201 (FIG. 2A) according to the present disclosure may be suitable for correcting and treating a relatively high myope (e.g., a −4 D myope). The lens 201 is configured to be worn over the cornea of an eye (not shown). The lens 201 comprises a posterior surface 202 and an anterior surface 204. A first section of the posterior surface 202 defines a central correction region 206. The first section of the posterior surface 202 defining the central correction region 206 has a radius of curvature less than the radius of curvature the cornea. A second section of the posterior surface 202 defines an annular treatment recess 208. The annular treatment recess 208 is defined by the second section of the posterior surface having a radius of curvature less than the radius of curvature of the correction region 206. A third section of the posterior surface 202 defines a regulating region 210. The regulating region 210 is defined by the third section of the posterior surface of the lens having a radius of curvature less than both the radius of curvature of the correction region 206 and less than the radius of curvature of the annular treatment recess 208. At the periphery of the lens is a fitting region 212. The fitting region 212 assists in stabilising the lens 201 to the eye when in use. The fitting region 212 may have a continual radius of curvature across its width, or it may have multiple radii of curvature across its width.

Figure 2B:
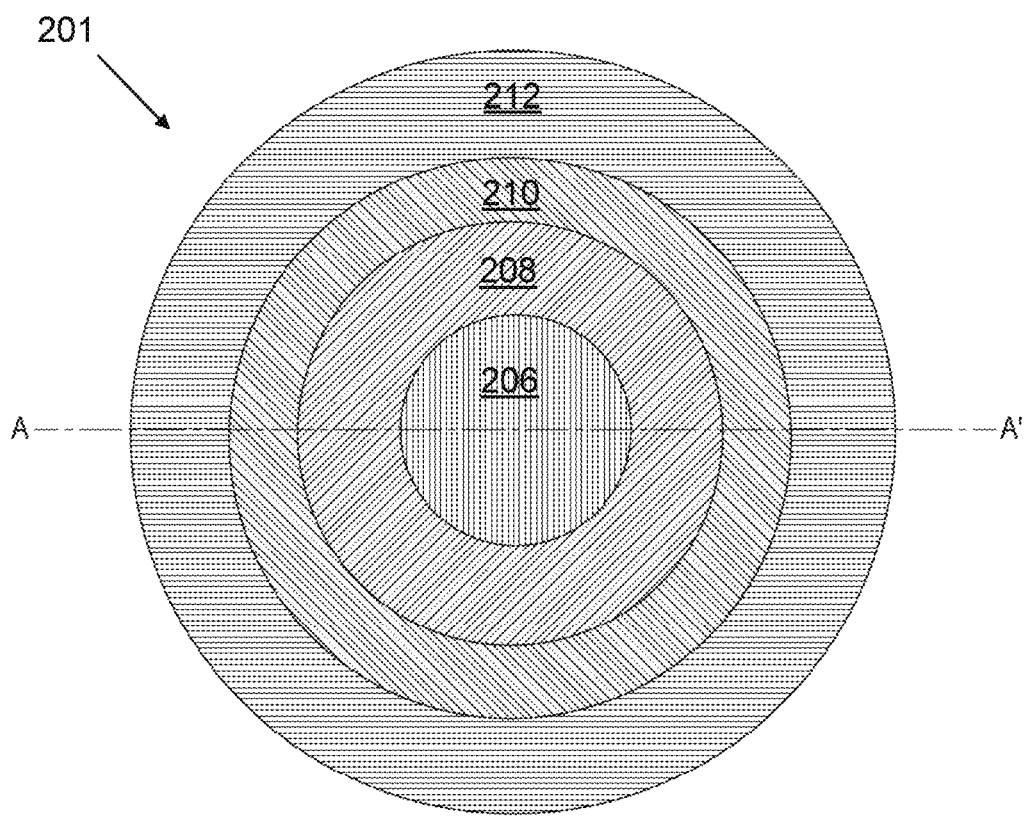
FIG. 2B is a plan view of the lens 201 shown in FIG. 2A. The border of each concentric region corresponds with the boundary of a lens region which is typically defined by a change in curvature of the posterior surface 202 of the lens.

The lens 201 comprises four concentric regions (FIG. 2B). Each region is centred about the axis of the lens 201. The central portion of the lens 201 is the correction region 206. Extending radially outwards from the perimeter of the correction region 206 is the annular treatment recess 208. Adjacent the annular treatment recess 208 is the regulating region 210. The outermost region of the lens 201 is the fitting region 212.

Figure 3A:
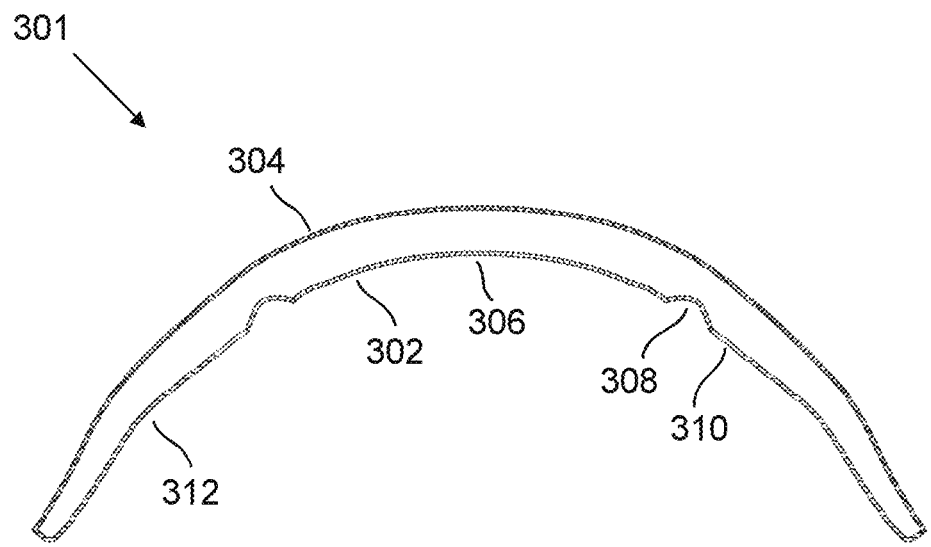
FIG. 3A is a cross-sectional view of a lens 301 according to the disclosure, taken along axis B-B' of FIG. 3B. The lens is suitable for treating or slowing progression of myopia in a relatively low myope.

An orthokeratology contact lens 301 (FIG. 3A) may be suitable for correcting and treating a relatively low myope (e.g., a −1 D myope). The lens 301 is configured to be worn over the cornea of an eye (not shown). The lens 301 comprises a posterior surface 302 and an anterior surface 304. A first section of the posterior surface 302 defines a central correction region 306. The first section of the posterior surface 302 defining the correction region 306 has a radius of curvature less than the radius of curvature of a cornea to be treated (not shown). Because the lens is suitable for treating a relatively low myope the correction region 306 may be more curved, or less flat, than the correction region 206 shown in FIG. 2A. A second section of the posterior surface 302 defines an annular treatment recess 308. The annular treatment recess 308 is defined by the second section of the posterior surface 302 having a radius of curvature less than the radius of curvature of the correction region 306. A third section of the posterior surface 302 defines a regulating region 310. The regulating region 310 is defined by the third section of the posterior surface 302 of the lens 301 having a radius of curvature equal to the radius of curvature of the correction region 306 and a radius of curvature greater than the radius of curvature of the annular treatment recess 308. Thus, in contrast to the lens 201 shown in FIG. 2A, the lens 301 shown in FIG. 3A has a regulating region 310 which is relatively flat. At the periphery of the lens is a fitting region 312. The fitting region 312 assists in stabilising the lens 301 to the eye when in use. The fitting region 312 may have a continual radius of curvature across its width, or it may have multiple radii of curvature across its width.

Figure 3B:
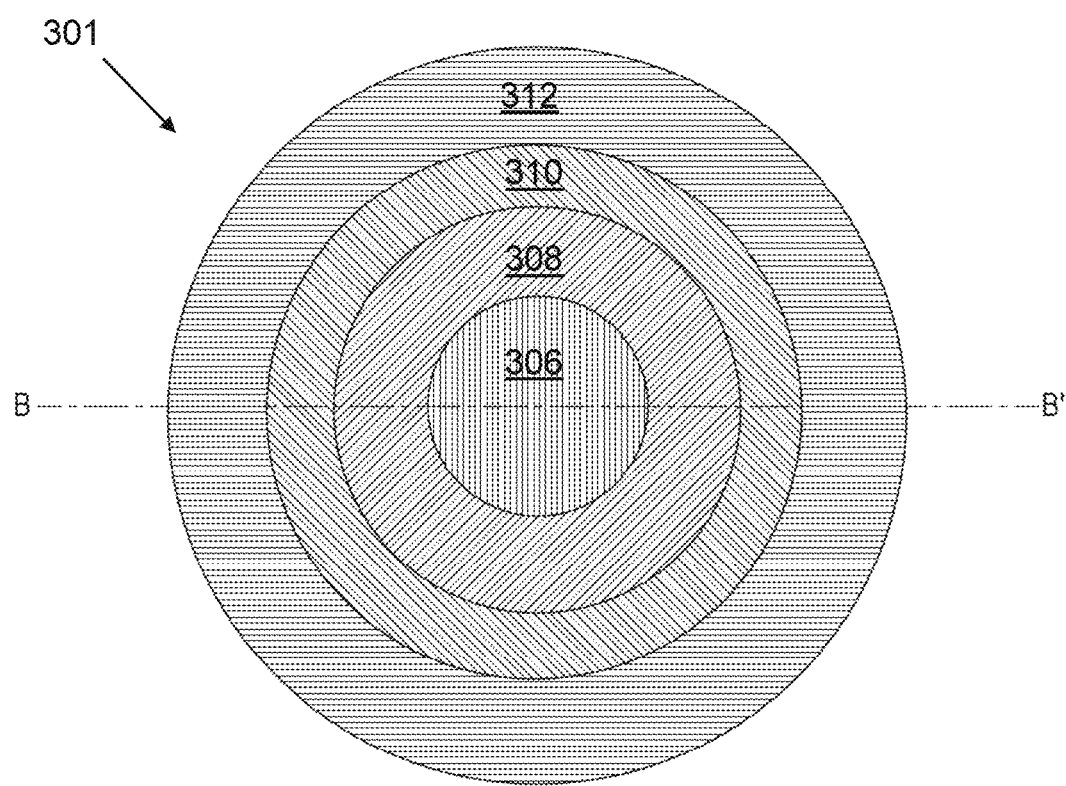
FIG. 3B is a plan view of the lens 301 shown in FIG. 3A. The border of each concentric region corresponds with the boundary of a lens region which is typically defined by a change in curvature of the posterior surface 302 of the lens.

The lens 301 has four concentric regions (FIG. 3B). Each region is centred about the axis of the lens 301. The central portion of the lens 301 is the correction region 306. Extending radially outwards from the perimeter of the correction region 306 is the annular treatment recess 308. Adjacent the annular treatment recess 308 is the regulating region 310. The outermost region of the lens 301 is the fitting region 312.

Figure 4A:
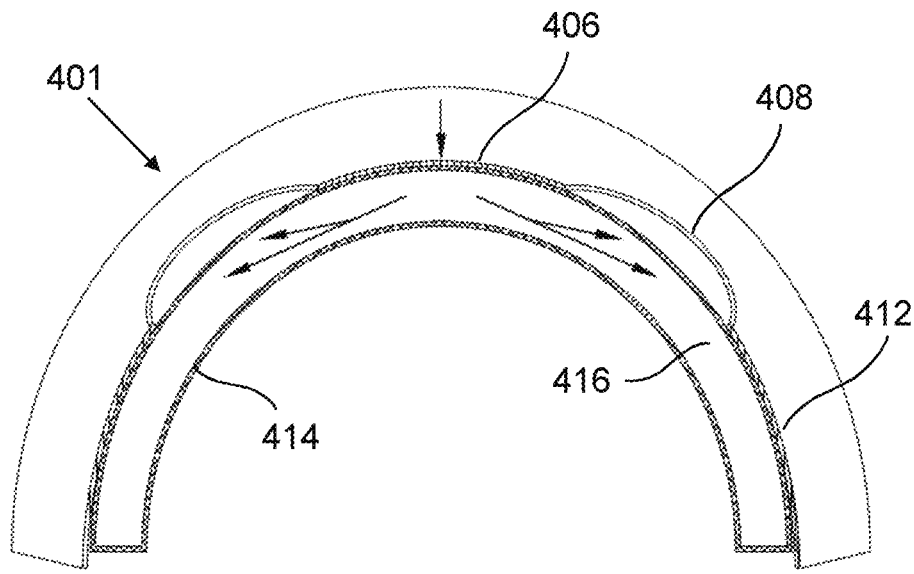
FIG. 4A is a cross-sectional view of a lens 401 according to the disclosure, in use. The lens 401 is placed on the surface of a cornea 414. For simplicity, the regulating region of the lens is not shown. The arrows indicate compressive forces applied by the central correction region 406 of the lens 401 onto the cornea 414 and the resulting flow of fluid and/or tissue from the central portion of the cornea 414 to a peripheral portion of the cornea 414.

In use, an orthokeratology contact lens 401 is placed on the surface of a cornea 414 to be treated (FIG. 4A) (only the upper most surface of the cornea 414 is shown, it will be understood that the uppermost surface of the cornea includes the epithelium layer 416). A correction region 406 aligns with a central portion of the cornea 414, including the apex of the surface of the cornea 414. An annular treatment recess 408 aligns with a peripheral portion of the surface of the cornea 414. For simplicity, the regulating region is not shown in FIG. 4A but is located between the annular treatment recess 408 and a fitting region 412. Different shading is used in FIG. 4A to indicate different regions of the lens.

The structure of the corneal epithelium layer 416 of the cornea 414 means that the epithelium layer 416 of the cornea 414 is flexible and moldable. The structure and physiology of the corneal epithelium enables its thickness to be altered by applying sustained pressure. Fluid and/or tissue (and other organic material typically found in the eye) of the corneal epithelium layer 416 may be redistributed from one region of the cornea 414 to another by exertion of pressure onto the surface of the cornea 414. As the radius of curvature of the correction region 406 of the lens 401 is less than the radius of curvature of the cornea 414 to be treated, the correction region 406 makes contact with at least a centre portion of the cornea 414 and applies a pressure or compressive force to the apex of the cornea 414 (as indicated by the central, vertical arrow in FIG. 4A). This results in fluid and/or tissue of the corneal epithelium layer 416 being forced into a peripheral portion of the cornea 414, shown in FIG. 4A by the arrows radiating from the centre of the cornea 414. The annular treatment recess 408 aligns with the peripheral portion of the cornea 414 and provides a space into which the cornea 414 may expand as a result of the redistribution of cells/fluid from the central region of the cornea 414 to the peripheral portion.

Figure 4B:
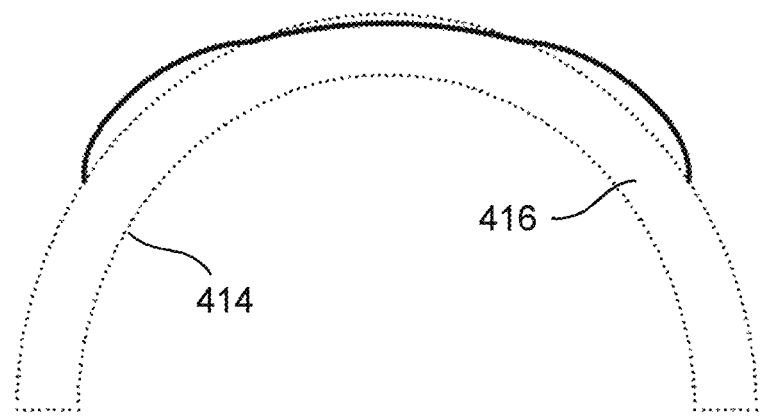
FIG. 4B is a cross-sectional view of the surface profile of the cornea 414 before and after treatment. The dashed line shows the surface profile of the cornea 414 prior to treatment with lens 401 of FIG. 4A. The bold line shows regions of the cornea 414 that have a modified surface profile following treatment with lens 401. The surface profile of the cornea 414 after treatment has a flattened and less curved central portion and raised and more curved peripheral portion compared to the profile of the cornea 414 before treatment.

The surface profile of the cornea 414 before treatment (dashed line) is different to the surface profile of the cornea 414 after treatment (bold line) (FIG. 4B). Thus, fluid and/or cell redistribution in the epithelial layer 416 of the cornea 414 can be used to reduce or increase corneal curvature and thus optical power. A central portion of the cornea 414 which aligned with the correction region 406 has been flattened, or is less curved, in the treated cornea 414 compared to the cornea 414 before treatment. Because the central portion of the treated cornea 414 is less curved, the focus of the light reflected from a distant object will be centred onto the retina, rather than in front of the retina, thus correcting the vision. In contrast, the peripheral portion of the cornea 414 that was adjacent the annular treatment recess 408 is a raised portion, or a more curved portion, of the treated cornea 414 compared to pre-treatment. Because the peripheral portion of the cornea 414 after treatment is more curved than the central portion, a positive power is induced over the base power of the central portion. Such a region of add power or myopic defocus in the peripheral portion of the lens is thought to slow or limit the progression of myopia.

The shape of the corrected cornea 414 is retained even when the lens 401 is removed from the eye. Overtime, the shape of the cornea 414 will relax towards it's uncorrected or pre-treatment state. When the shape of the cornea 414 reverts towards the uncorrected state to such an extent that long distance vision is impaired, the lens 401 can be placed back on the cornea 414 to reshape the profile of the cornea 414 once again.

According to the present disclosure, the dimensions including diameter, width, curvature and shape of each of the lens correction region, annular treatment recess and regulating region may be adjusted to influence the surface profile induced in the cornea being treated. For example, the diameter of the correction region of the lens will influence the diameter of the central portion of the cornea that is flattened. It may be desirable to provide a standard diameter of the central portion of the cornea being flattened across all myopes being treated with a lens according to the disclosure. This may be achieved by selecting a diameter of the correction region of the lens that will induce a correction across a diameter of the central portion of the cornea that is the same across all myopes being treated, for example the central portion of the cornea that is corrected by the correction region of the lens may be about 3 mm in diameter. It may be that the diameter of the correction region is selected in dependence on the degree of myopia to be treated. For example, a lens for treating a low myope may have a correction region having a smaller diameter than the correction region of a lens for treating a higher myope. However, the radius of curvature of the lens correction region will vary between lenses, depending on the degree of myopia being treated, since a higher myope requires more flattening. In general, the greater than amount of myopic refractive error to be corrected, the flatter the correction region (i.e., the greater the radius of curvature of the correction region). The lens annular treatment recess always has a curvature greater than the central correction zone of the lens for providing an add power to the cornea. The radius of curvature width and shape of the annular treatment recess can be adjusted for each lens depending on the radius of curvature of the correction region. Similarly, the function of the lens regulating region is also dependent on the dimensions of the correction region and thus the dimensions of this region will vary with the correction region curvature or the amount of myopia being corrected. As explained herein, the regulating region may be a recess to accumulate corneal volume during treatment, or alternatively the regulating region may be a flatter, tilted region to either reduce or facilitate volume accumulation in the peripheral portion of the cornea aligned with the annular treatment recess of the lens. It may be that the greater the power differential between the correction region and annular treatment recess, the flatter the regulating region (i.e. the greater the radius of curvature of the regulating region). For example, the power differential between the correction region and the annular treatment recess may be +1 D, +1.5 D, +2 D, +2.5 D, +3 D, +3.5 D, +4 D, +4.5 D, +5 D, +5.5 D, +6 D, +6.5 D or +7 D. It will be understood that the power differential refers to the difference in power induced in the central portion of the cornea aligned with the correction region and the peripheral portion of the cornea aligned with the annular treatment recess. The regulating region has a radius of curvature such that sufficient epithelial fluid and/or tissue is distributed to the peripheral portion of the cornea to induce the desired myopic defocus. When the power differential between the correction region and annular treatment recess of the lens is large, it may be that an insufficient amount of epithelial tissue and/or fluid is displaced by the correction region and thus an insufficient amount of tissue and/or fluid is directed towards the peripheral portion of the cornea to induce the desired myopic defocus. Additionally or alternatively, it may be that substantially all of the displaced fluid and/or tissue needs to be directed to the peripheral portion of the cornea aligned with the treatment recess and thus movement of the displaced tissue and/or fluid towards the periphery of the cornea needs to be avoided. Therefore, when the power differential between the correction region and annular treatment recess of the lens is large, a flatter regulating region may be desirable to direct tissue and/or fluid towards the peripheral portion of the cornea aligned with the annular treatment recess. In contrast, when the power differential between the correction region and annular treatment recess is small, sufficient fluid and/or tissue may be directed to the peripheral portion of the cornea aligned with the annular treatment recess. It may be desirable, in this case, that the regulating region is a recess to accommodate the excess displaced fluid and/or tissue. Therefore, when the power differential between the correction region and annular treatment recess of the lens is small, a more curved regulating region (i.e. a recess) may be desirable to direct tissue and/or fluid towards the peripheral portion of the cornea aligned with the annular treatment recess. It will be understood that reference to "adjustment", "varying" or the like of dimensions of regions of the lens does not refer to changing the dimensions of a lens once the lens is formed, but rather refers to the ability to design a lens by selecting from a range of dimensions and then making a lens according to the selected dimensions. The various dimension that may be adjusted will now be described with reference to FIG. 5 to FIG. 8. Arrows within the figures indicate the movement of fluid and/or tissue within a cornea in accordance with the profile of the correction region, annular treatment recess, and regulating region. The following embodiments relate to a lens suitable for inducing a +2 D myopic defocus in a peripheral portion of the cornea. It will be understood that the lenses according to the present disclosure may be designed to induce a myopic defocus less than +2 D, or greater than +2 D in the peripheral portion of the lens. The dimensions of the correction region, annular treatment recess and regulating region will be selected depending on the desired myopic defocus to be induced in the peripheral portion of the lens, as described herein.

Figure 5:
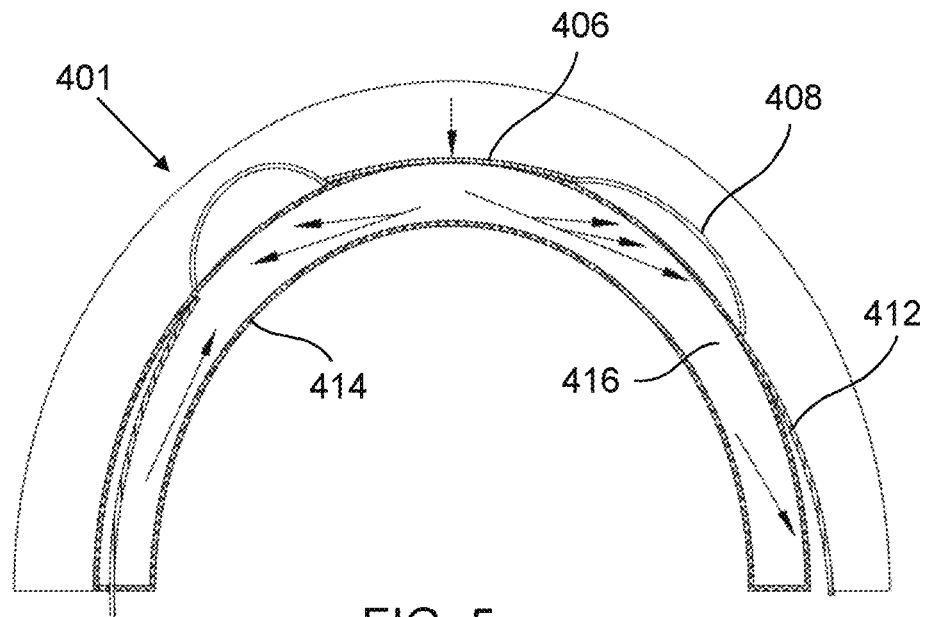
FIG. 5 is a cross-sectional view of the lens 401 of FIG. 4A wherein regions of the lens 401 (correction region 406, annular treatment recess 408 and fitting region 412) are shown. The dimensions (width, curvature, depth, asphericity and symmetry) of those regions may be adjusted to control the movement of corneal tissue and/or fluid and thus induce a particular profile in the cornea to be treated, which are shown. For simplicity, the regulating region of the lens 401 is not shown. Arrows indicate the movement of fluid and/or tissue within the cornea 414.

Several regions and profiles of a lens 401 may be modified to induce particular optical profile in the cornea (FIG. 5). With regard to FIG. 5, the left and right hand sides of the lens 401 show different profiles of regions of the lens but it is to be understood that this is merely to illustrate the various dimensions of the regions that may be modified. It will be understood that a lens according to the present disclosure may comprise regions which are uniform in their dimension across all meridians of the lens. The central correction region 406 of the lens 401 may be made smaller or larger in diameter depending on the desired diameter of the central portion of the cornea 414 to be flattened. The curvature of the correction region 406 may also be modified, depending on the amount of myopia to be corrected. For example, a flatter or less curved central correction region 406 may be effective for treating a high myope (e.g., a myope of −4.0 D) and a more curved central correction region 406 may be effective for treating a low myope (e.g., a myope of −1.0 D). The shape of the central correction region 406 may also be modified. For example, the central correction region 406 may be symmetrical, or it may be asymmetrical. The shape of the correction region 406 may be aspherical. An aspherical profile may be particularly advantageous for providing a more even profile across the central portion of the corrected cornea. In a similar manner, the shape, diameter and width of the annular treatment recess 408 and the regulating region (not shown in FIG. 5) may also be modified. Additionally, the dimensions of the fitting region 412 may be modified to control the redistribution of fluid and/or tissue of the corneal epithelium layer 416. For example, the curvature of the fitting region 412 can be made steeper or flatter. It will be understood that in in FIG. 5, the left hand side of the lens 401 has a steeper fitting region 412 which is steeper than the corneal surface profile 414. The steeper fitting region 412 will push against the side of the cornea 414 to move fluid towards the centre of the cornea 414. The right hand side of the lens 401 shows a fitting region 412 that is less steep than the cornea 414. The less steep fitting region 412 allows the side of the cornea 414 to expand and thus fluid and/or tissue of the corneal epithelium layer 416 is redistributed towards the side of the cornea 414, away from the centre of the cornea 414. It may be that the fitting region 412 comprises multiple regions, each region having a different radius of curvature. Thus, the pressure applied by this region of the lens may be more accurately controlled.

Figure 6:
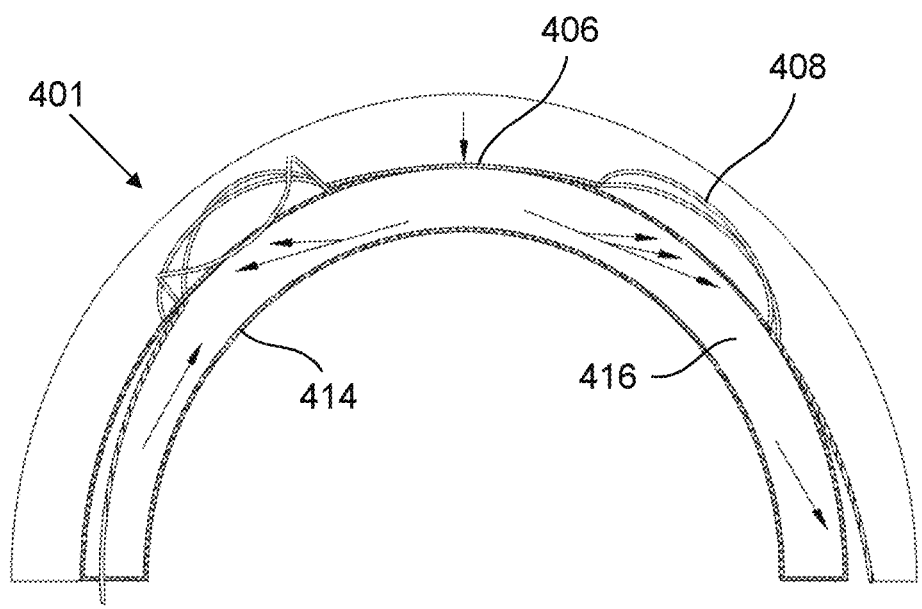
FIG. 6 is a cross-sectional view of the lens 401 of FIG. 4A in which dimensions of the annular treatment recess 408 that may be adjusted, are shown. For simplicity, the regulating region of the lens 401 is not shown. On the left hand side of the lens 401 is indicated a change of width of the annular treatment recess 408. On the right hand side of the lens is indicated a change of tilt or asphericity of the annular treatment recess 408. Arrows indicate the movement of fluid and/or tissue within the cornea 414.

Dimensions of the annular treatment recess of a lens may be modified. With reference to FIG. 6, on the left hand side of the lens 401 is indicated a change of width of the annular treatment recess 408 (only numbered on the right hand side). On the right hand side of the lens 401 is indicated a change of tilt or asphericity of the annular treatment recess 408. The annular treatment recess 408 may be tilted towards the central correction region 406, or the annular treatment recess 408 may be tilted away from the central correction region 406. The tilt of the annular treatment recess 408 may be used to control the direction of flow of tissue and/or fluid of the epithelial layer 416 of the cornea 414. For example, when the annular treatment recess 408 is tilted away from the central correction region 406, tissue and/or fluid of the epithelial layer 416 may be prevented from moving towards the periphery of the cornea 414. This may be advantageous in treating a low myope. In contrast, when the annular treatment recess 408 is tilted towards the central correction region 406, movement of tissue and/or fluid of the epithelial layer 416 may be facilitated towards the periphery of the cornea 414. This may be advantageous in treating a high myope.

Figure 7:
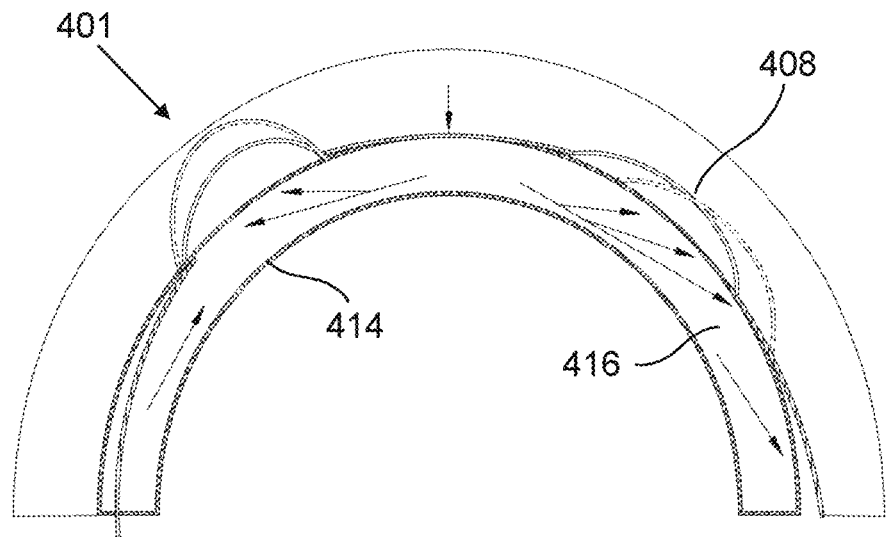
FIG. 7 is a cross-sectional view of the lens 401 of FIG. 4A in which further dimensions of the annular treatment recess 408 that may be adjusted are shown. For simplicity, the regulating region of the lens 401 is not shown. On the left hand side of the lens 401 is indicated a change of curvature and tilt of the annular treatment recess 408. On the right hand side of the lens 401 is indicated a change of position of the annular treatment recess 408. Arrows indicate the movement of fluid and/or tissue within the cornea 414.

Further dimensions of the annular treatment recess may also be adjusted (FIG. 7). For simplicity, the regulating region of the lens 401 is not shown. On the left hand side of the lens 401 is indicated a change of curvature of the annular treatment recess 408 (only numbered on the right hand side). The curvature of the annular treatment recess 408 influences the myopic defocus induced in the cornea 414. The smaller the radius of curvature of the annular treatment recess 408 (the more curved the annular treatment recess 408), the greater increase in curvature of the cornea 414 caused by redistribution of fluid and/or tissue in the epithelial layer 416 that can be accommodated in the annular treatment recess 408. On the right hand side of the lens 401 is indicated a change of position of the annular treatment recess 408. The position of the annular treatment recess 408 determines the position of myopic defocus induced in the cornea 414.

Figure 8:
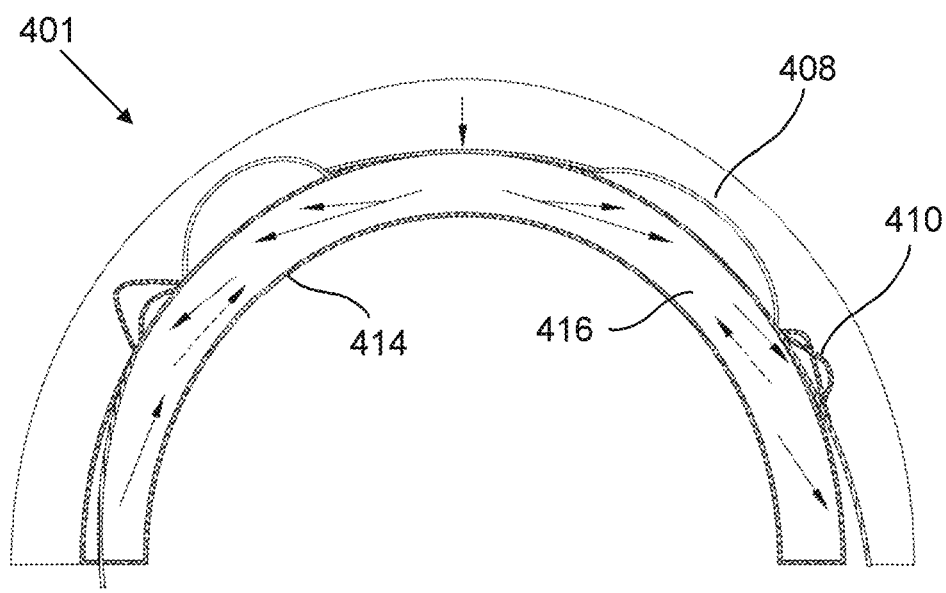
FIG. 8 is a cross-sectional view of the lens 401 of FIG. 4A in which dimensions of the regulating region 410 that may be adjusted are shown. On the left hand side of the lens 401 is indicated a change of curvature of the regulating region 410 and a change in width. On the right hand side of the lens 401 is indicated a change of asphericity and symmetry of the regulating region 410. Arrows indicate the movement of fluid and/or tissue within the cornea.

Dimensions of the regulating region 410 may also be adjusted. With reference to FIG. 8, on the left hand side of the lens 401 is indicated a change of curvature of the regulating region 410 (only numbered on the right hand side) and a change in width. The curvature of the regulating region 410 influences the curvature of cornea 414 in the region aligned with the regulating region 410. On the right hand side of the lens 401 is indicated a change of asphericity and tilt of the regulating region 410. Arrows indicate the movement of fluid and/or tissue within the epithelial layer 416 of the cornea 414. When the regulating region 410 is a recess, the movement of the fluid and/or tissue within the cornea 414 is towards the regulating region 410.

When the regulating region 410 is flatter, the movement of the fluid and/or tissue within the cornea 414 is towards the annular treatment recess 408 (dashed arrow in FIG. 8). The tilt of the regulating 410 region may also influence the direction of the fluid and/or tissue movement in the epithelial layer 416 of the cornea 414.

Figure 9:
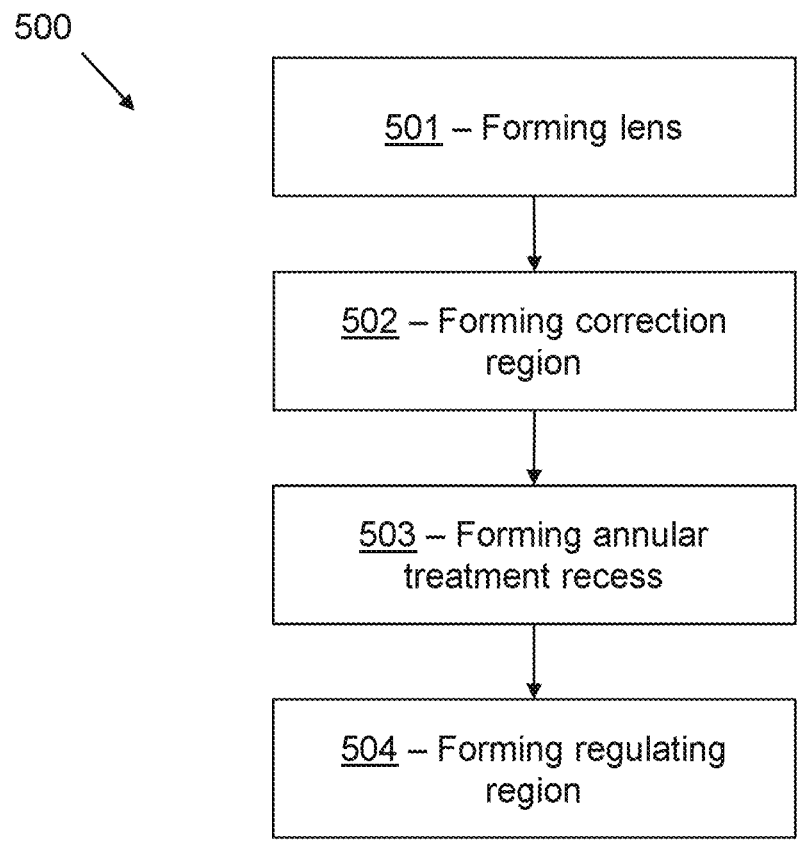
FIG. 9 is a method 500 of manufacturing a lens according to the disclosure.

A method 500 of manufacturing a lens (FIG. 9) according to the present disclosure comprises, in a first step 501, forming a lens having a posterior surface. This step may comprise forming the lens body having a posterior surface. The posterior surface of the lens body is then modified in the subsequent steps to from a posterior surface of the lens according to the present disclosure. The method comprises the step 502 of forming a correction region defined by a first section of the posterior surface. The method comprises the step 503 of forming an annular treatment recess defined by a second section of the posterior surface. The method comprises the step 504 of forming a regulating region defined by a third section of the posterior surface. It may be that the steps of forming the correction region 502, the annular treatment recess 503 and the regulating region 504 are performed simultaneously while forming the lens or lens body in step 501. For example, the lens may be formed in a mold which is shaped to form a posterior surface of the lens having multiple curvatures, wherein a first section of the posterior surface has a curvature that defines the correction region, a second section of the posterior surface has a curvature that defines an annular treatment recess and a third section of the surface has a curvature defining the regulating region. Alternatively, it may be that the steps of forming the correction region 502, the annular treatment recess 503 and the regulating region 504 are performed sequentially (and in any order). For example, it may be that the method comprises forming the lens or lens body in step 501 without at least one of an annular treatment recess or a regulating region being present. In this situation, the posterior surface of the lens or lens body may have a radius of curvature equal to that of the correction region across substantially all of its surface. The step of forming the annular treatment recess 503 or the step of forming the regulating region 504 may then be performed by lathing to correct a section or multiple sections of the posterior surface of the lens or lens body so that the sections have a radius of curvature that defines at least one of the annular treatment recess and the regulating region according to the present disclosure.

Figure 10:
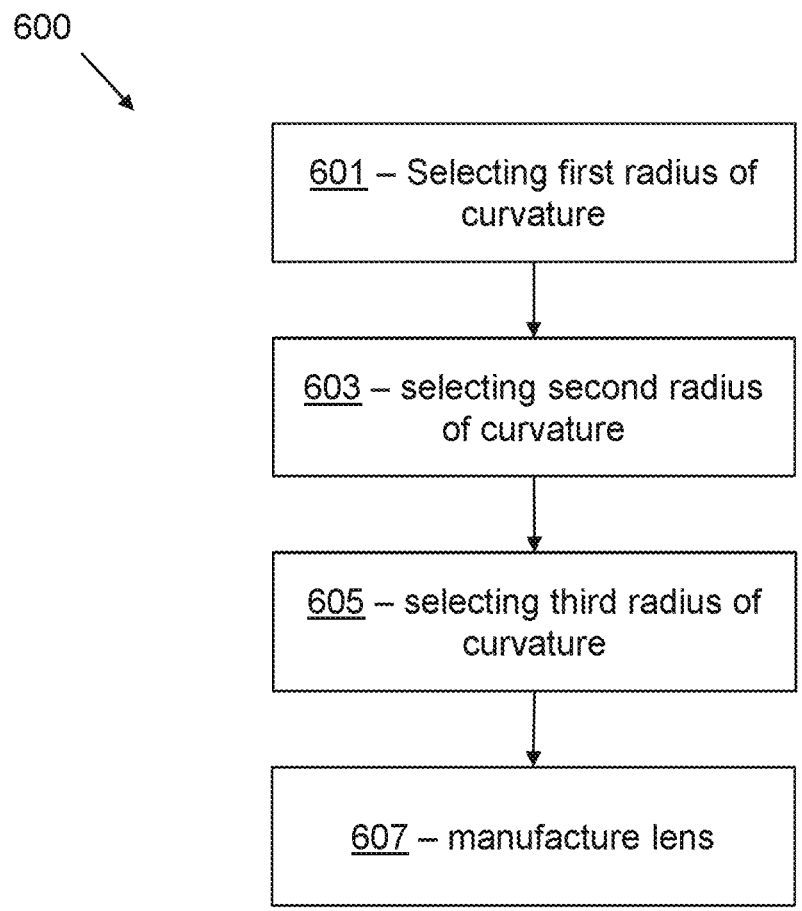
FIG. 10 is a further method 600 of manufacturing a lens according to the disclosure.

A method 600 of manufacturing a lens (FIG. 10) according to the disclosure and having a posterior surface comprising multiple sections, each section having a radius of curvature. A first section of the posterior surface of the lens defines a correction region of the lens, a second section defines an annular treatment recess of the lens, and a third section defines a regulating region of the lens. The method comprises the step 601 of selecting a radius of curvature of the first section of posterior surface of a lens. The radius of curvature of the first section is at least 6 mm. The method comprises the step 603 of selecting a radius of curvature of the second section of the posterior surface of the lens. The radius of curvature of the second section is less than the radius of curvature of the first section. The method comprises the step 605 of selecting a radius of curvature of the third section of the posterior surface of the lens. The radius of curvature of the third section is in the range from 4.5 mm to 15 mm. The method 600 finally comprises the step 607 of manufacturing the lens so that the posterior surface has multiple sections having radii of curvature selected in steps 601, 603 and 605.

Whilst the present disclosure has been described and illustrated with reference to particular embodiments, it will be appreciated by those of ordinary skill in the art that the disclosure lends itself to many different variations not specifically illustrated herein.

EXAMPLES

Exemplary orthokeratology lenses according to the present disclosure will now be presented. The following examples relate to a lens suitable for inducing a +2 D myopic defocus in a peripheral portion of the cornea. It will be understood that the lenses according to the present disclosure may be designed to induce a myopic defocus less than +2 D, or greater than +2 D in the peripheral portion of the lens. The dimensions of the correction region, annular treatment recess and regulating region will be selected depending on the desired myopic defocus to be induced in the peripheral portion of the lens, as described herein.

Example 1—Correcting and Treating a Low Myope

In a first example, an orthokeratology lens suitable for correcting a low myope of −1.00 D was designed.

Assuming a nominal cornea power of 42D (8.03 mm) and −1.00 DS refraction, the following parameters were calculated for each region of the lens according to example 1.

Region 1 (correction region): The base optical zone radius (BOZR) required for the central correction region=42D (nominal cornea power)+−1.00 (myope correction)+−0.75 (Jessen factor)=40.25 D. This correlates to a radius of curvature of 8.39 mm. The diameter of the central zone is selected as 3.36 mm.

Region 2 (annular treatment recess): To provide an add power of +2.00 D, region 2 must have a curvature of 40.25D+2D=42.25 D. This correlates to a radius curvature of 7.99 mm. The width of region 2 was selected as 1.4 mm.

Region 3 (regulating region): This r radius curvature of region 3 was selected as 8.39 mm. The width of region 3 was selected as 1 mm.

Region 4 (fitting region): 0.0 to 0.9 mm flatter than BOZR of region 1 i.e. 9.29 mm. The width is 1.5 mm.

Region 5 (fitting region): 0.0 to 0.9 mm flatter than BOZR of region 1 i.e. 9.29 mm. The width is 1.5 mm.

The diameter and curvature of regions 4 and 5 (fitting region) may be varied with eccentricity value for the cornea. These zones are used to stabilise the lens on the cornea.

Region 6 (edge lift) has a radius of 0.1 mm. The edge lift is an outermost portion of the lens which does not contact the cornea when the lens is worn.

For correction of a low myope, less fluid and/or cell tissue needs to be displaced from the central correction region of the cornea compared to a higher myope because the cornea requires less flattening. In the lens according to example 1, the region 3 (regulating region) has a radius of curvature greater than the radius of curvature of the region 2 (annular treatment recess). Without wishing to be bound by theory, it is thought that region 3 may direct the displaced fluid and/or cells into the region of the cornea bounded by region 2. This may create a larger positive curvature and more add power in the region of the cornea bounded by region 2. It is intended that power in the corneal region bounded by region 2 will have an add power of at least +2 D greater than the region of the cornea bounded by the correction region (region 1).

Example 2—High Myope

In a second example, an orthokeratology lens suitable for correcting and treating a high myope of −4.00 D was designed.

Assuming a nominal cornea power of 42D (8.03 mm) and −4.00 DS refraction, the following parameters were calculated for each region of the lens according to example 2.

Region 1 (correction region): The base optical zone radius (BOZR) required for the central correction region=42D (nominal cornea power)+−4.00 (myope correction)+−0.75 (Jessen factor)=37.25 D. This correlates to a radius of curvature of 9.06 mm (i.e. greater than the radius of curvature of region 1 required for a low myope, example 1). The diameter of the central correction zone is selected as 3.36 mm.

Region 2 (annular treatment recess): To provide an add power of +2.00 D, region 2 must have a curvature of 37.25D+2D=39.25 D. This correlates to a radius curvature of 8.6 mm. The width of region 2 was selected as 1.4 mm.

Region 3 (regulating region): The radius of curvature of region 3 was selected to be 8.18 mm. The width of region 3 was selected as 1 mm.

Region 4 (fitting region): 0.0 to 0.9 mm flatter than BOZR of region 1 i.e. 9.96 mm. The width is 1.5 mm.

Region 5 (fitting region): 0.0 to 0.9 mm flatter than BOZR of region 1 i.e. 9.96 mm. The width is 1.5 mm.

The diameter and curvature of regions 4 and 5 (fitting regions) may be varied with eccentricity value for the cornea. These zones are used to stabilise the lens on the cornea.

Region 6 (edge lift) has a width of 0.1 mm. The edge lift is an outermost portion of the lens which does not contact the cornea when the lens is worn.

For correction of a high myope, more central flattening of the cornea must occur than for a low myope. This results in a higher volume or cells and/or tissue being displaced from the central correction zone. Ordinarily, displacement of the cells and/or tissue to a peripheral region of the cornea will result in a myopia treatment zone having a larger than +2D because of the large volume of tissue and/or fluid that needs to be accommodated in the reverse curve. However, to control the myope treatment zone diameter and to limit the power shift to be in the desired range of +2 D, region 3 (the regulating region) has a steeper curvature than region 2 (the annular treatment recess). Without wishing to be bound by theory, it is thought that region 3 acts as a well or reservoir for excess tissue and/or fluid displaced by the correction zone (region 1) and that cannot be accommodated by the annular treatment recess (region 2).

Although in the present examples the curvature of the annular treatment recess and the regulating region is modified to achieve a desired add power in the peripheral portion of the cornea, it may be that the diameter of the annular treatment recess and the regulating region is additionally or alternatively modified to control the amount of fluid and/or tissue accommodated in the peripheral portion of the cornea.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

The invention claimed is:

1. An orthokeratology contact lens for correcting and slowing progression of myopia by reshaping a portion of the cornea of a myopic eye;

the lens having a posterior surface for contacting with the portion of cornea to be reshaped, wherein the posterior surface comprises:

a correction region for reducing the curvature of a central portion of the cornea, the correction region being defined by a first section of the posterior surface having a radius of curvature;

an annular treatment recess for inducing myopic defocus in a peripheral portion of the cornea, wherein the annular treatment recess extends radially outwards from a perimeter of the correction region and is defined by a second section of the posterior surface having a radius of curvature less than the radius of curvature of the first section, and wherein the radius of curvature of the second section is such that the annular treatment recess is configured to induce a myopic defocus of at least +1 D in the peripheral portion of the cornea and less than +12 D in the peripheral portion of the cornea; and, a regulating region for regulating the myopic defocus induced by the annular treatment recess, wherein the regulating region extends radially outwards from a perimeter of the annular treatment recess and is defined by a third section of posterior surface having a radius of curvature;

wherein the orthokeratology lens is according to (i) or (ii), wherein:

(i) the radius of curvature of the first section of the posterior surface of the lens defining the correction region is in the range from 8.8 mm to 9.3 mm; and, the radius of curvature of the second section of the posterior surface of the lens defining the annular treatment recess is in the range from 8.3 mm to 8.8 mm, provided the radius of curvature of the second section is less than the radius of curvature of the first section of the posterior surface;

the radius of curvature of the third section of the posterior surface of the lens defining the regulating region is in the range from 7.9 mm to 8.4 mm provided the radius of curvature of the third section is less than the radius of curvature of the first section of the posterior surface; and wherein the radius of curvature of the third section of the posterior surface is less than the radius of curvature of the second section of the posterior surface;

(ii) the radius of curvature of the first section of the posterior surface of the lens defining the correction region is in the range from 7 mm to 9.5 mm; and, the radius of curvature of the second section of the posterior surface of the lens defining the annular treatment recess is in the range from 5.5 mm to 8.5 mm, provided the radius of curvature of the second section is less than the radius of curvature of the first section; and, the radius of curvature of the third section of the posterior surface of the lens defining the regulating region is in the range from 7.0 mm to 15.0 mm, wherein the radius of curvature of the third section is greater than the radius of curvature of the second section defining the annular treatment recess; and, wherein the radius of curvature of the regulating region is greater than the radius of curvature of the correction region.

2. The orthokeratology lens according to claim 1, wherein the correction region has a diameter in the range from 1 mm to 8 mm.

3. The orthokeratology lens according to claim 1, wherein at least one of the annular treatment recess and the regulating region has a width in the range from 0.5 mm to 5.5 mm.

4. The orthokeratology lens according to claim 1, wherein the orthokeratology lens is according to (ii), wherein the radius of curvature of the first section of the posterior surface of the lens defining the correction region is in the range from 8.0 mm to 8.5 mm; and, wherein the radius of curvature of the second section of the posterior surface of the lens defining the annular treatment recess is in the range from 7.7 mm to 8.2 mm, provided the radius of curvature of the second section is less than the radius of curvature of the first section; and, wherein the radius of curvature of the third section of the posterior surface of the lens defining the regulating region is in the range from 8.0 mm to 8.5 mm, wherein the radius of curvature of the third section is greater than the radius of curvature of the second section defining the annular treatment recess;

wherein the radius of curvature of the regulating region is greater than the radius of curvature of the correction region.

5. The orthokeratology lens according to claim 1, wherein the correction region is defined by a first section of the posterior surface of the lens that is aspherical.

6. The orthokeratology lens according to claim 1, wherein at least one of the second section of the posterior surface of the lens defining the annular treatment recess or the third section of the posterior surface of the lens defining the regulating region has an asymmetrical profile.

7. The orthokeratology lens according to claim 1, wherein the posterior surface of the lens further comprises a fitting region for stabilising the lens to the cornea, wherein the fitting region extends radially outwards from a perimeter of the regulating region.

8. A method of manufacturing the orthokeratology contact lens according to claim 1, wherein the lens is for correcting and treating myopia by reshaping a portion of a cornea of a myopic eye, wherein the method comprises forming the posterior surface of the lens by:

forming the first section of the posterior surface, wherein the first section defines the correction region of the lens and has the radius of curvature;

forming the second section of the posterior surface that extends radially outwards from a perimeter of the correction region, wherein the second section defines the annular treatment recess and has the radius of curvature less than the radius of curvature of the first section, and wherein the radius of curvature of the second section such that the annular treatment recess is configured to induce a myopic defocus of at least +1 D and less than +12 D in the peripheral portion of the cornea; and, forming the third section of the posterior surface that extends radially outwards from a perimeter of the annular treatment recess, wherein the third section defines the regulating region and has the radius of curvature.

9. The method according to claim 8, wherein the method comprises first forming the lens without at least one of the annular treatment recess or the regulating region, and then forming the second section of the posterior surface defining the annular treatment recess or the third section of the posterior surface defining the regulating region by changing the curvature of the portion of posterior surface of the lens using a lathe.

10. The method according to claim 8, wherein the method comprises forming the lens in a mold, wherein a surface of the mold defines at least one of the first section of the posterior surface defining the correction region, the second section of the posterior surface defining the annular treatment recess, and the third section of the posterior surface defining the regulating region of the lens.

11. A method of treating myopia progression comprising providing the lens according to claim 1 to a subject in need thereof.

12. The method according to claim 11, wherein the method comprises reshaping the cornea of the subject by fitting the lens on the cornea of the subject.

13. The method according to claim 11, wherein the subject is a human under the age of 25 years.

14. The orthokeratology lens according to claim 1, wherein the correction region has a diameter in the range from 2.5 mm to 5.5 mm.

15. The orthokeratology lens according to claim 1, wherein at least one of the annular treatment recess and the regulating region has a width in the range from 1 mm to 2 mm.

* * * * *